US00RE42021E

(19) United States
(12) Reissued Patent
Pollmann et al.

(10) Patent Number: US RE42,021 E
(45) Date of Reissued Patent: Jan. 4, 2011

(54) EQUALIZER PERFORMANCE ENHANCEMENTS FOR BROADBAND WIRELESS APPLICATIONS

(76) Inventors: Stephen C. Pollmann, 8531 Tyler St., Santee, CA (US) 92071; Eli Arviv, 25/4 Emek Ayalon Street, Modiein, 71700 (IL); Jacques Behar, 5823 Erlanger, San Diego, CA (US) 92122; Timothy L. Gallagher, 840 Val Sereno Dr., Encinitas, CA (US) 92024; David Gazelle, 7B Oranium Street, Givaat Shemuel (IL), 54052; Frederick W. Price, 1730 Orchard Wood Rd., Encinitas, CA (US) 92024

(21) Appl. No.: 11/187,034

(22) Filed: Jul. 20, 2005

(Under 37 CFR 1.47)

Related U.S. Patent Documents

Reissue of:
(64) Patent No.: 6,597,733
Issued: Jul. 22, 2003
Appl. No.: 09/800,268
Filed: Mar. 5, 2001

(51) Int. Cl.
*H04B 1/38* (2006.01)
*H03H 7/30* (2006.01)
*H03K 5/159* (2006.01)

(52) U.S. Cl. ..... 375/222; 375/231; 375/232
(58) Field of Classification Search ..... 375/219, 375/222, 229–233, 259, 260, 316, 324, 344–346
See application file for complete search history.

(56) References Cited

U.S. PATENT DOCUMENTS 3,949,404 A 4/1976 Fletcher et al.
4,232,197 A 11/1980 Acampora et al.
4,495,619 A 1/1985 Acampora
4,575,857 A 3/1986 Murakami
4,599,732 A 7/1986 LeFever
4,775,988 A 10/1988 Chevillat et al.
4,849,989 A 7/1989 Kamerman
4,849,996 A 7/1989 Kamerman
5,297,144 A 3/1994 Gilbert et al.
5,420,851 A 5/1995 Seshadri et al.
5,444,698 A 8/1995 Kito
5,487,181 A 1/1996 Dailey et al.

(Continued)

OTHER PUBLICATIONS

Office Action, mailed Jun. 28, 2002 for U.S. Appl. No. 09/800,268.

(Continued)

*Primary Examiner*—David B Lugo
(74) *Attorney, Agent, or Firm*—Schwabe, Williamson & Wyatt P.C.

(57) ABSTRACT

A system and method for enhancing the performance of an equalizer in a modem. Multiple techniques are disclosed which improve the modem performance. A first technique uses stored parameters for each burst from each remote site to demodulate a received data stream. A second technique compensates for the gain droop caused by storing parameters across each burst. A third technique minimizes errors caused by adapting the equalizer coefficients for each data burst by analyzing the SN ratio and error rate of the received burst. A fourth technique improves the convergence of the equalizer by using a two-part preamble, whereby both parts are transmitted using different modulation techniques. A fifth technique is provided which performs a soft reset of the modem without performing a complete reset of the modem. A sixth technique determines a modem adaptation factor based on the expected modulation type of an incoming burst transmission. A seventh technique calculates a phase correction value for the stored tap values and applies the value to the incoming signal.

120 Claims, 13 Drawing Sheets

U.S. PATENT DOCUMENTS

| | | | | |
|---|---|---|---|---|
| 5,511,082 | A | 4/1996 | How et al. | |
| 5,566,210 | A | 10/1996 | Saito et al. | |
| 5,615,212 | A | 3/1997 | Ruszczyk et al. | |
| 5,638,371 | A | 6/1997 | Raychaudhuri et al. | |
| 5,638,374 | A | 6/1997 | Heath | |
| 5,675,573 | A | 10/1997 | Karol et al. | |
| 5,751,708 | A | 5/1998 | Eng et al. | |
| 5,768,254 | A | 6/1998 | Papadopoulos et al. | |
| 5,828,695 | A | 10/1998 | Webb | |
| 5,859,619 | A | 1/1999 | Wu et al. | |
| 5,890,055 | A | 3/1999 | Chu et al. | |
| 6,002,713 | A | 12/1999 | Goldstein et al. | |
| 6,006,069 | A | 12/1999 | Langston | |
| 6,016,311 | A | 1/2000 | Gilbert et al. | |
| 6,016,313 | A | 1/2000 | Foster, Jr. et al. | |
| 6,038,455 | A | 3/2000 | Gardner et al. | |
| 6,075,808 | A | 6/2000 | Tsujimoto | |
| 6,094,421 | A | 7/2000 | Scott | |
| 6,112,080 | A | 8/2000 | Anderson et al. | |
| 6,263,077 | B1 | 7/2001 | Zuranski et al. | |
| 6,836,515 | B1 * | 12/2004 | Kay et al. | 375/260 |
| 2002/0126748 | A1 | 9/2002 | Rafie et al. | |

OTHER PUBLICATIONS

International Search Report, mailed Jul. 24, 2002 for application PCT/US02/06879.

Office Action, mailed Dec. 19, 2002 for U.S. Appl. No. 09/800,268.

Notice of Allowability, mailed Mar. 4, 2003 for U.S. Appl. No. 09/800,268.

C.E. Shannon, "A Mathemetical Theory of Communication," Bell System Technical Journal, pp. 379–423 (Part 1), 623–656 (Part II), Jul., Oct. 1948.

Lin., et al., "Error Control Coding, Fundamentals and Applications," Prentice–Hall Computer Applications in Electrical Engineering Series., 1993, pp. 315–349.

Redl, et al., "An Introductionto GSM," Artech House, Inc., 1995, pp. 84, 85 and 95.

"Asynchronous Transfer Mode (ATM) Technical Overview", 2nd Edition, Prentice Hall, Oct. 1995, Chapter 3. pp. 21–25.

Wolf, et al. On the Weight Distribution of Linear Block codes Formed From Convolutional Codes, IEEE Transactions on Communications, vol. 44:9, Sep. 1996.

L.H. Charles Lee, "Convolutional Coding: Fundamentals and Applications," Artech House, Inc., 1997, pp. 11–51.

Ulm., et al., "Data–Over–Cable Interface Specifications, Radio Freqency Interface Specification," Hewlett Packard Interim Specification, Doc. Control No.: SP–RFII01–970321, published Mar. 21, 1997 by MCNS Holdings, L.P., Section 6, pp. 43–85.

Written Opinion, mailed Dec. 9, 2002 for application PCT/US02/06879.

International Preliminary Examination Report, mailed Mar. 21, 2003 for application PCT/US02/06879.

* cited by examiner

| Cable Length | BER with Preamble Type 1 | BER with Preamble Type 2 | RS Error Rate with Preamble Type 1 | RS Error Rate with Preamble Type 2 |
|---|---|---|---|---|
| 1000FT | 5.42e−4 | 4.22e−4 | 6e−6 | No Error over a million bursts. |
| 2000FT | 8.88e−4 | 6.55e−4 | 1.2e−4 | 1.6e−5 |

EQUALIZER PERFORMANCE ENHANCEMENTS FOR BROADBAND WIRELESS APPLICATIONS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a home base modem system in a wireless communication system that provides telephone, data and Internet connectivity to a plurality of users.

2. Description of Related Art

Several systems are currently in place for connecting computer users to one another and to the Internet. For example, many companies such as Cisco Systems, provide data routers that route data from personal computers and computer networks to the Internet along conventional twisted pair wires and fiber optic lines. These same systems are also used to connect separate offices together in a wide area data network.

However, these systems suffer significant disadvantages because of the time and expense required to lay high capacity communications cables between each office. This process is time consuming and expensive. What is needed in the art is a high capacity system that provides data links between offices, but does not require expensive communication cables to be installed.

Many types of current wireless communication systems facilitate two-way communication between a plurality of subscriber radio stations or subscriber units (either fixed or portable) and a fixed network infrastructure. Exemplary systems include mobile cellular telephone systems, personal communication systems (PCS), and cordless telephones. The objective of these wireless communication systems is to provide communication channels on demand between the subscriber units and the home base in order to connect the subscriber unit with the fixed network infrastructure (usually a wired-line system). Several types of multiple access systems currently exist for wirelessly transferring data between multiple sites. For example, wireless communication systems have typically used a Code Division Multiple Access (CDMA), Time Division Multiple Access (TDMA) or Frequency Division Multiple Access (FDMA) type system to facilitate the exchange of information between two users. These access schemes are well known in the art.

Often in these wireless communication systems a modem is used for modulating and demodulating the information that is exchanged between users. Inside the modem circuit an equalizer is employed to correct distortions either in the wireless channel or fix imperfections in the analog circuitry. A novel equalizer with enhancements to improve performance especially using higher order QAM modulation is described herein.

SUMMARY OF THE INVENTION

In one embodiment, the method comprises demodulating a data stream transmitted between remote sites and a home base using stored parameters for each remote site comprising receiving data from a current remote site at a home base, retrieving a parameter associated with a next remote site from a memory, storing the retrieved parameter for the next remote site in a first buffer, storing a second parameter associated with the current remote site into the memory, determining the initial phase and gain values for the next remote site based on the retrieved parameter, receiving data from the next remote site at the home base, and demodulating the data received from the next remote site using the determined initial phase and gain values.

In one embodiment, the method comprises compensating for gain droop in a modem which stores equalizer coefficients across data bursts between a remote site and a home base comprising receiving channel data values from an equalizer, calculating the gain for the equalizer based on the received channel data values, and scaling the input to the equalizer to achieve a value of 1 based on the calculated gain.

In one embodiment, the method comprises minimizing errors caused by adapting equalizer coefficients for each data burst from a remote site to a home base comprising retrieving a first equalizer coefficient for a current remote site, demodulating a data burst from the current remote site, determining the S/N ratio for the received burst, determining the error rate from the demodulated burst, comparing the determined S/N ratio and error rate to defined thresholds, and updating the first equalizer coefficient based on the comparisons.

In one embodiment, the method comprises improving the convergence of an equalizer in a multi-modulation modem using a two part preamble comprising defining a first part of a preamble with a lower order section, wherein the lower order section is transmitted using QPSK modulation, defining a second part of the preamble with a higher order section, wherein the higher order section is transmitted using QAM 64 modulation, transmitting both the first and second parts of the preamble, receiving the transmitted preamble, and converging the equalizer based on the received preamble.

In one embodiment, the method comprises providing a soft reset to a modem comprising generating an interrupt to the modem, halting the modem interface, setting a reset bit, flushing a buffer, realigning the buffer, reprogramming the buffer, and restarting the interface.

In one embodiment, the method comprises determining an adaptation factor for an equalizer based on the expected modulation type of an incoming burst transmission comprising calculating channel characteristics and metrics for a first burst transmission from a remote site, comparing the channel characteristics and metrics, determining an expected modulation type for a second burst transmission from the remote site based on the comparison, selecting an adaptation factor based on the expected modulation type, and applying the selected adaptation factor to the second burst transmission.

In one embodiment, the method comprises correcting the phase shift caused by the storage of tap values after each incoming burst transmission comprising determining an angle of correction based on correlating the input and output of the equalizer and applying the determined angle of correction to the incoming signal.

BRIEF DESCRIPTION OF THE DRAWINGS

Like reference numbers and designations in the various drawings indicate like elements.

DETAILED DESCRIPTION OF THE INVENTION

Throughout this description, the embodiment and examples shown should be considered as exemplars, rather than as limitations on the present invention.

Figure 1:
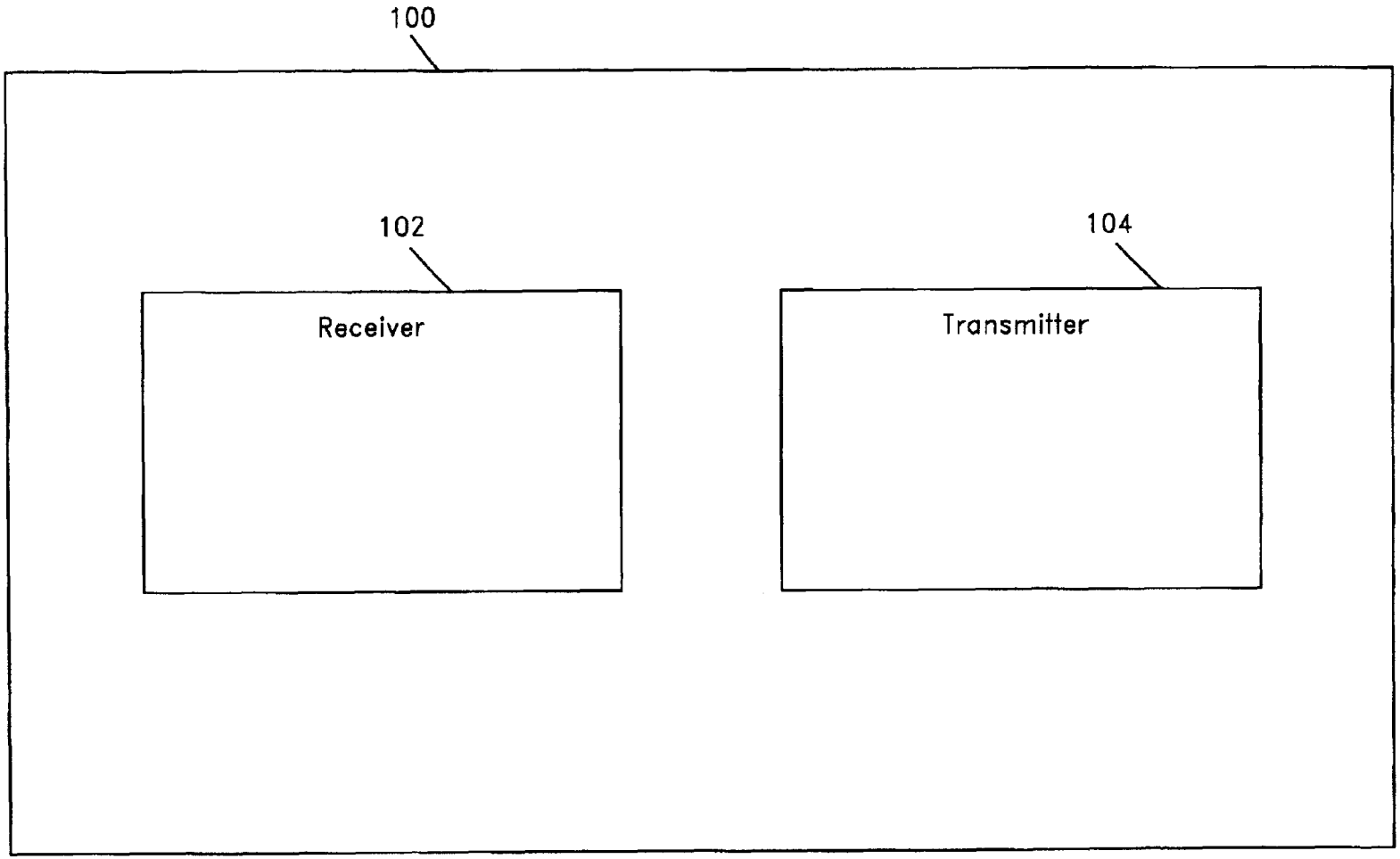
FIG. 1 is a block diagram of one embodiment of a modem.

As shown in FIG. 1, one embodiment of a modem 100 includes a receiver module 102 and a transmitter module 104. The transmitter module 104 receives digital data from a communications processor (not shown) and converts the data to an appropriately modulated analog carrier signal, for example, quadrature amplitude modulation (QAM) or quadrature phase shift keying modulation. The analog signal may or may not be up converted to a carrier frequency prior to transmission. The receiver module 102 demodulates an incoming modulated carrier signal and converts it back to its original digital form. A similar or identical modem may be used as the other end of a communication link.

Figure 2:
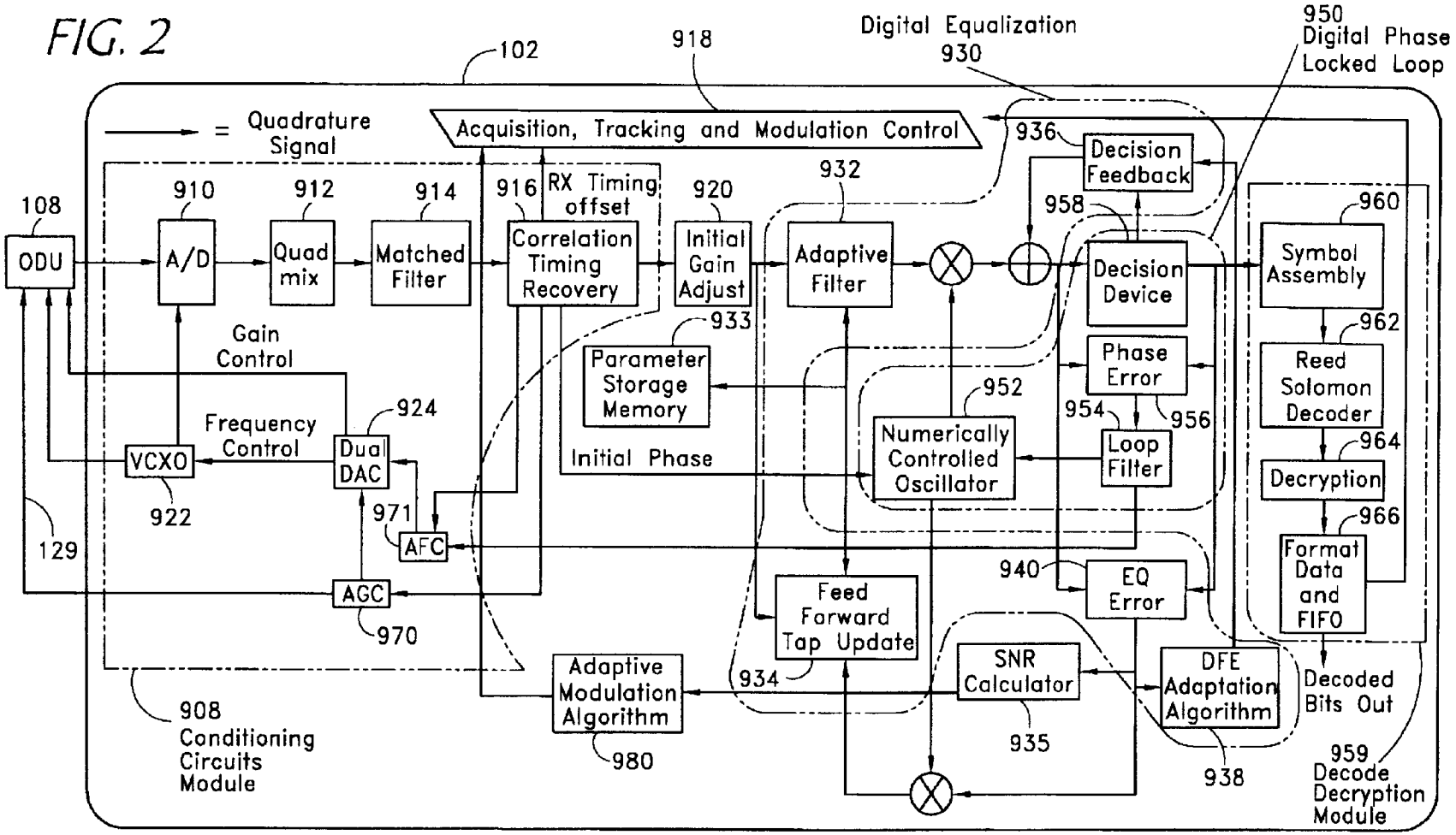
FIG. 2 is a block diagram of one embodiment of a receiver module for the modem.

One embodiment of the receiver module 102 is illustrated in FIG. 2. The receiver module 102 includes a conditioning circuit module 908, a digital equalization module 930, a digital phase-locked loop module 950, a decode/decryption module 959, a parameter storage memory module 933, an initial gain adjust module 920, an adaptive modulation module 980, a signal to noise ratio ("SNR") calculator 935, and an acquisition, tracking, and modulation control module 918.

One embodiment of the conditioning circuit module 908 includes an analog to digital converter 910, a digital quadrature mixer 912, a matched filter 914, a correlation timing recovery module 916, an automatic frequency control module 971, an automatic gain control module 970, a dual digital to analog converter 924, and a voltage controlled oscillator 922. The down-converted signal from the Intermediate Frequency (IF) is sampled by the digital to analog converter 910 to produce a digital output that is provided to the digital quadrature mixer 912. In one embodiment, the digital quadrature mixer 912 splits the received signal into it's quadrature components and translates the signal, for example, from a 20 MHz IF, to baseband.

The matched filter module 914 maximizes the signal to noise ratio by "matching" the frequency response of the receiver module 102 to the signal generated at the transmitter module 104. In one embodiment, the matched filter module 914 also rejects adjacent and unwanted signals that could be generated by other transmitters in the system, or interfering spurs generated by imperfections in the analog circuitry.

Still referring to FIG. 2, the filtered output from the matched filter 914 is then driven into the correlation timing recovery module 916.

The acquisition, tracking and modulation control module 918 provides control information, such as the modulation type or format of data, for the received burst to the correlation timing recovery module 916. The acquisition, tracking and modulation control module 918 performs acquisition tracking and modulation control. Multiple data signals are fed to the acquisition, tracking and modulation control module 918 to control the high level operations of the receiver module 102.

In one embodiment, the correlation timing recovery module 916 aligns the symbol timing to the samples fed to the digital equalization 930, and calculates the initial gain and phase offset so that the digital equalization 930 can quickly perform channel inversion and correct any residual distortion due to inaccuracies in the phase and timing estimations. In one embodiment, the correlation timing recovery module 916 calculates the sample timing error by performing correlation between the received preamble with a copy of the expected preamble. The output of the correlation timing recovery module 916 is fed to an interpolation circuit, which further refines the received sample timing offset. After the interpolation filter of the correlated preamble sequence, an accurate calculation, for example, to 1/16 symbol time is fed to a polyphase filter which manipulates the received samples to correct for the timing. Even though the samples may be aligned to the correct timing, the constellation may be rotated relative to a phase of zero degrees. The correlation timing recovery module 916 will calculate this angle and feed it to the numerically controlled oscillator 952 so that the timing and phase are corrected enough for the digital equalization 930 to quickly fix any further distortions.

In one embodiment, the correlation timing recovery module 916 calculates the received gain offset. The gain is adjusted once based on the detected energy in the preamble correlator. Gain is adjusted digitally by feeding a value to the initial gain adjust 920. The initial gain adjust 920 maps the received quadrature symbols to the proper level before they are equalized by the equalizer. The initial gain is calculated by the correlation timing recovery module 916. The correlation timing recovery module 916 performs frequency acquisition and automatic frequency correction (AFC) in combination with AFC 971.

The modem 100 may be equipped with a process for providing soft resets. A reset signal, while the modem 100 is in transmit mode, may occur in several instances. For example, during uplink transmission, a software module may be too slow in sending data to the modem 100, as may occur if the data is modulated using quadrature amplitude modulation 64. In such a case, the limited data received by the modem 100 may cause an interrupt to be generated. The modem 100 then halts the transmit interface and sets a transmit-reset bit. The modem 100 then flushes, realigns, and reprograms the necessary buffers. Once this process is completed, the modem 100 restarts the transmit interface, completing the reset operation.

Similarly, a reset signal may occur while the modem 100 is in a receive mode. For example, the modem 100 may receive only bad cyclic redundancy check packets. In such a case, the modem 100 halts the receive interface and sets a receive-reset bit. The modem 100 then flushes and realigns the receive buffers and reprograms the necessary buffers. The modem 100 then restarts the receive interface, thus completing the reset operation.

Figure 3:
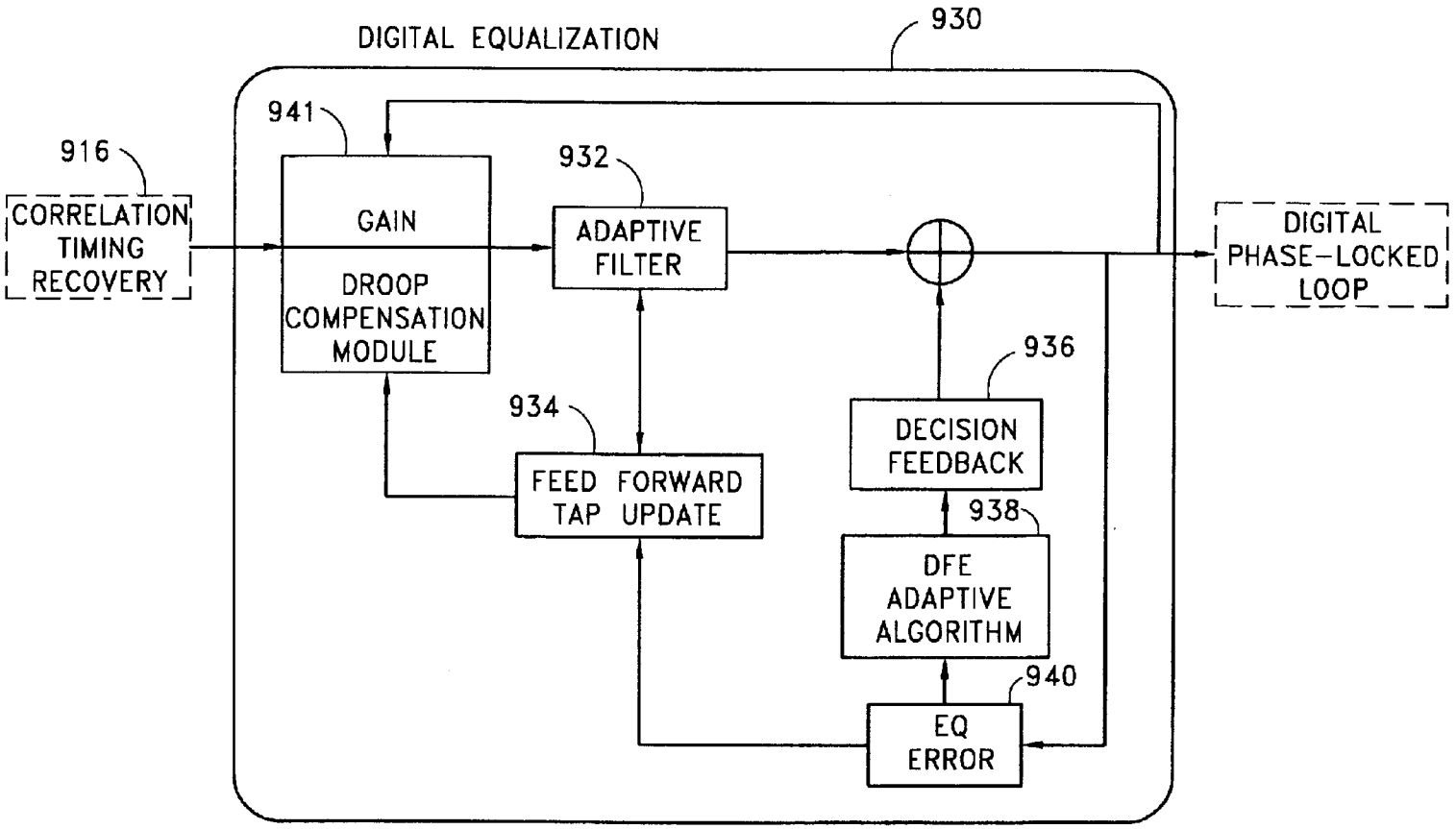
FIG. 3 is a block diagram of one embodiment of a Digital Equalization module from FIG. 2.

One embodiment of the digital equalization module 930, illustrated in FIGS. 2 and 3, includes a gain droop compensation module 941, an adaptive filter module 932, a feed forward tap update module 934, a decision feedback module 936, a DFE adaptation module 938, and an EQ Error calculator module 940.

The gain droop compensation loop 941 is located between the output of the correlation timing recovery module 916 and the input of the digital equalization module 930. The gain droop compensation loop 941 accounts for any gain variations due to radio droop in an outdoor unit (not shown) forcing a gain factor which is a ratio to the calculated gain observed in the digital equalization module 930. In one embodiment, this gain ratio is kept to unity.

Figure 4:
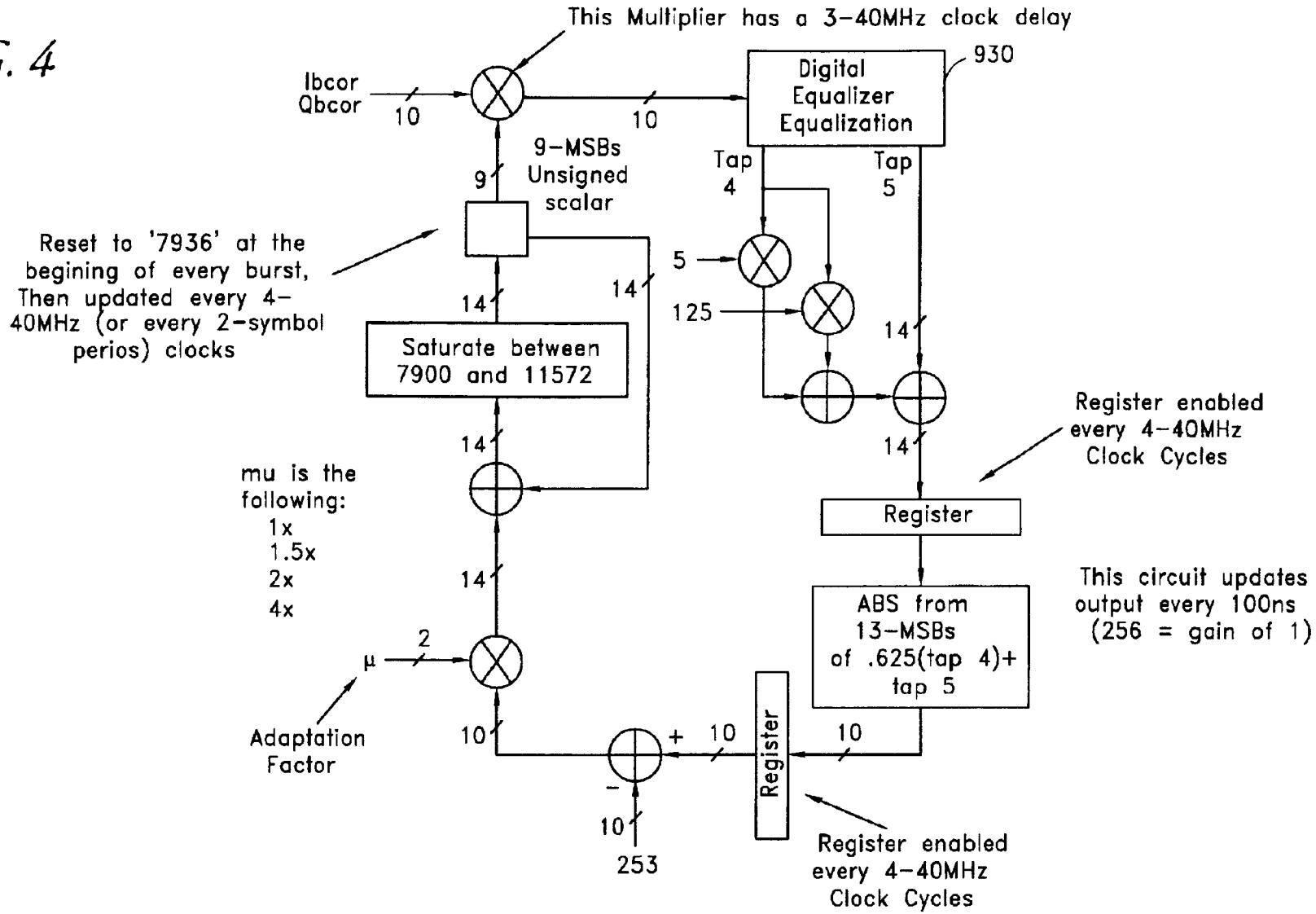
FIG. 4 is a block diagram of one embodiment of the gain droop compensation module shown in FIG. 3.

A detailed description of the gain droop compensation loop 941 is shown in FIG. 4. The outputs of the digital equalization module 930, for example, taps 4 and 5, are multiplied by 0.625 and 1, respectively. In one embodiment, the values of taps 4 and 5 are received after every symbol. This value is then summed with the resulting value being subtracted from nominal '1'. In one embodiment, this final value is 253. An adaptation factor (μ in FIG. 4), is then applied to this final value which is used to increment or decrement a gain constant similar to the adaptive filter 932 described in the digital equalization module 930. The gain constant multiplies the input signal value to provide a gain to the digital equalization module 930 to be '1'. A gain of '1' enhances the stability of the digital equalization module 930. In one embodiment, the gain constant is reset every burst wherein at the end of each burst, the digital equalization module 930 has a gain of '1.' In one embodiment where the digital equalization module 930 has a gain of '1', the gain estimation module 921 of the Correlation Timing Recovery module 916 assumes that the digital equalization module 930 starts with an initial gain of '1.'

The digital equalization module 930 corrects any signal impairments due to multipath reception or distortion caused by imperfections in the analog receiver circuits. In the modem, the transmitter module 104 sends a known training sequence before the burst so that the digital equalization module 930 can learn what the distortion is and undo it before the data arrives. The length of time the digital equalization module 930 is allowed to observe the impairments must be balanced against the amount of bandwidth that is wasted sending the training sequences over the channel. The digital equalization module 930 decimates the received data from the correlation timing recovery module 916 into a one-sample-per-symbol complex signal.

Within the equalizer, the acquisition, tracking and modulation control module 918 ascertains the next remote site's address and its expected modulation type based on comparisons of channel characteristics and metrics. In one embodiment, a reed solomon decoder module 962, illustrated as a component of the decode/decryption module 959, and the SNR calculator 935 calculate these channel characteristics and metrics. Once calculated, the adaptive modulation algorithm 980 compares the calculated channel characteristics and metrics and provides the information to the higher layers of the communication system. The higher layers then define what the expected modulation format is for the received burst from the next remote site. The higher layers convey these results to the acquisition, tracking and modulation control module 918. Depending on what modulation is expected, the digital equalizer uses different adaptation factors (μ's) for each received burst. Selecting an adaptation factor that is optimized for the received modulation type improves the performance of the modem by increasing the probability that the parameters stored in the parameter memory storage module 933 at the end of the processed burst will be valid.

Returning to FIG. 3, the digital equalization module 930 is composed of two sections: a feed-forward section and a feedback section. The feed-forward section is composed of an adaptive filter 932 and a feed forward tap update module 934. In one embodiment, the feed forward tap update 934 adapts the coefficients for the feed-forward section of the digital equalization module 930 based on the Least Mean Squares (LMS) module. This is a gradient descent-based feed forward tap update 934, which converges to a local minima by forcing the output of the adaptive filter 932 to a known state or a training sequence. The tap update formula for the gradient LMS module is given by:

$$W(k)=W(k-1)-\mu\nabla J$$

W(k) is the value of the new coefficient. W(k−1) is the value of the coefficient at the last instant in time. M is the step-size variable, and ∇J is the complex gradient of the system. The gradient for each dimension (tap) C for time k is given by:

$$\nabla_{Ck}J=-2x(k-c)\epsilon^*(k)$$

The equation for the error of the equalizer at time k is given by:

$$\epsilon(k)=d(k)-W(k)^H X(k)$$

Where:

ϵ=the error between the desired signal (training or decisions) and the filtered signal complex (I and Q channels) signal X d=The desired signal from a training sequence or feedback decisions W=The complex vector of the filter taps X=The input signal.

The preambles not only are used for timing recovery but are also used to converge the digital equalization module 930. The preambles are chosen so that home bases in adjacent sectors do not interfere with one another and that close remote sites will not interfere with one another. There is a different Preamble for uplink, and a different preamble for downlink. There are four types of uplink preambles (1) Unscheduled registration bursts, (2) scheduled 16-QAM bursts, (3) scheduled QPSK bursts, and (4) scheduled 64-QAM bursts. The hardware is designed to detect which preamble is being transmitted and decode the burst using the correct preamble. The preamble for the higher orders are subdivided into a QPSK section, and a higher order section allowing faster convergence in the digital equalization module 930 which is critical in burst modem design and at the same time can be used for symbol timing recovery.

Figure 5:
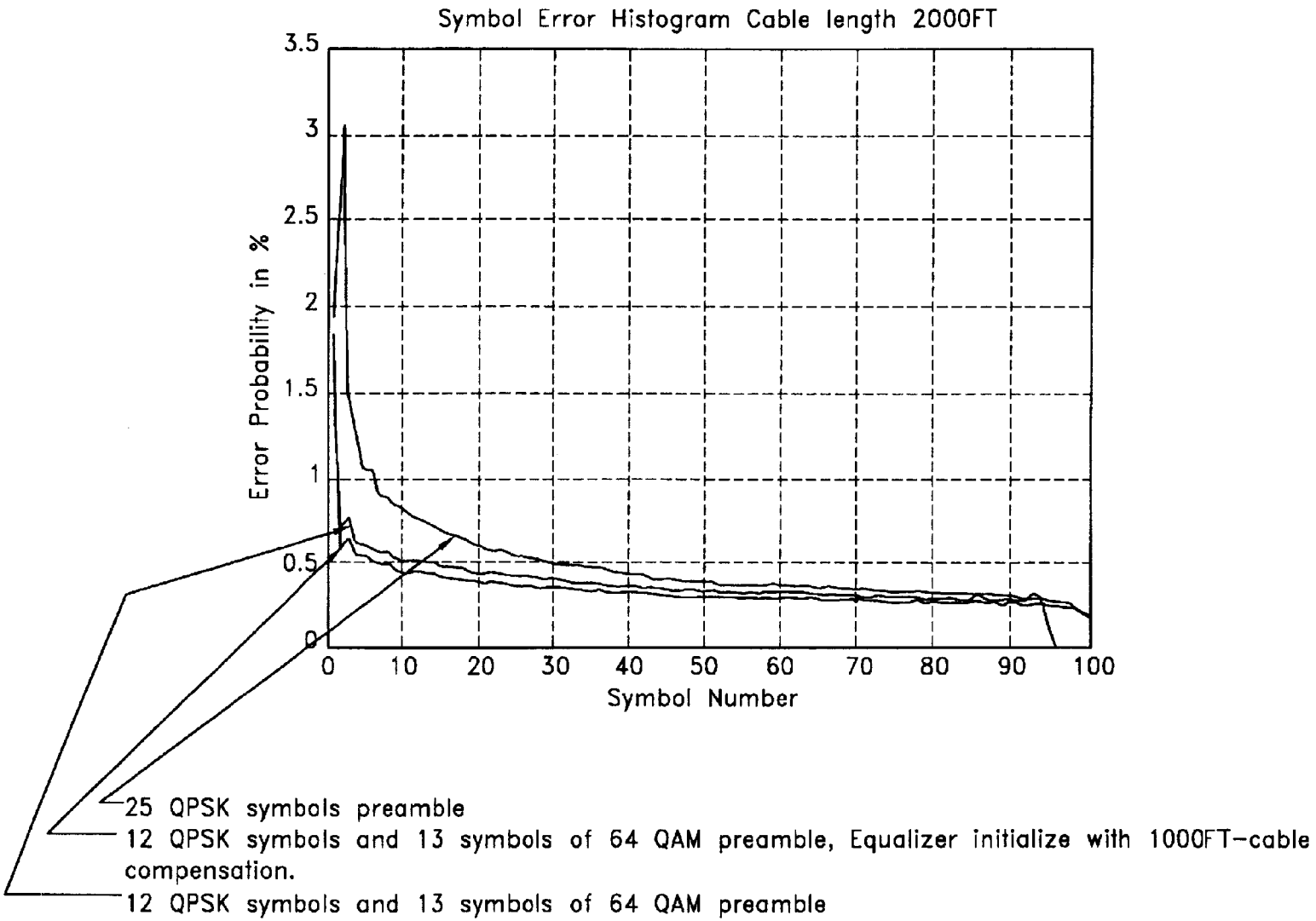
FIG. 5 illustrates a comparison of 64QAM Error Histograms using a two-type preamble with 2000 FT Cable.
Figures 6, 7:
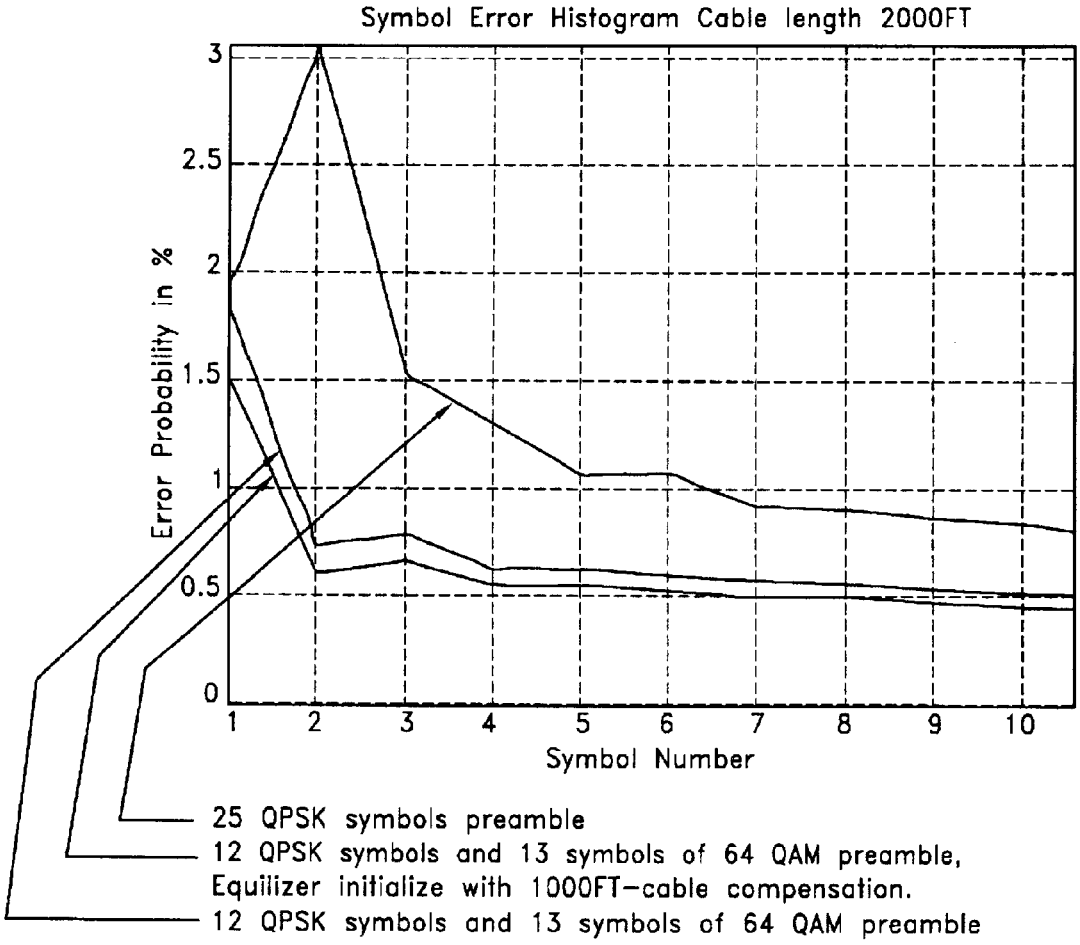
FIG. 6 is a zoomed view of FIG. 5.
FIG. 7 gives the BER and the probability of the first RS word using the two-type preamble and different cable length.

1) The preamble is a mixture of both End Points and Middle QAM-64 Points
2) The Preamble is chosen for Uplink and Downlink Differently so that Adjacent home bases will not detect each other as transmitting remote sites FIG. 5 illustrates a comparison of QAM-64 Error Histograms using a two-type preamble with 2000 FT Cable. FIG. 6 is a zoomed view of FIG. 5. FIG. 7 gives the BER and the probability of the first reed-solomon ("RS") word using the two-type preamble and different cable length. For example, if the digital equalization module 930 is pre compensate over 1000 FT cable using Preamble type 2 we get the following results: BER of 5.81e-4 and an RS Error Rate of 1.5e-5.

Figure 8:
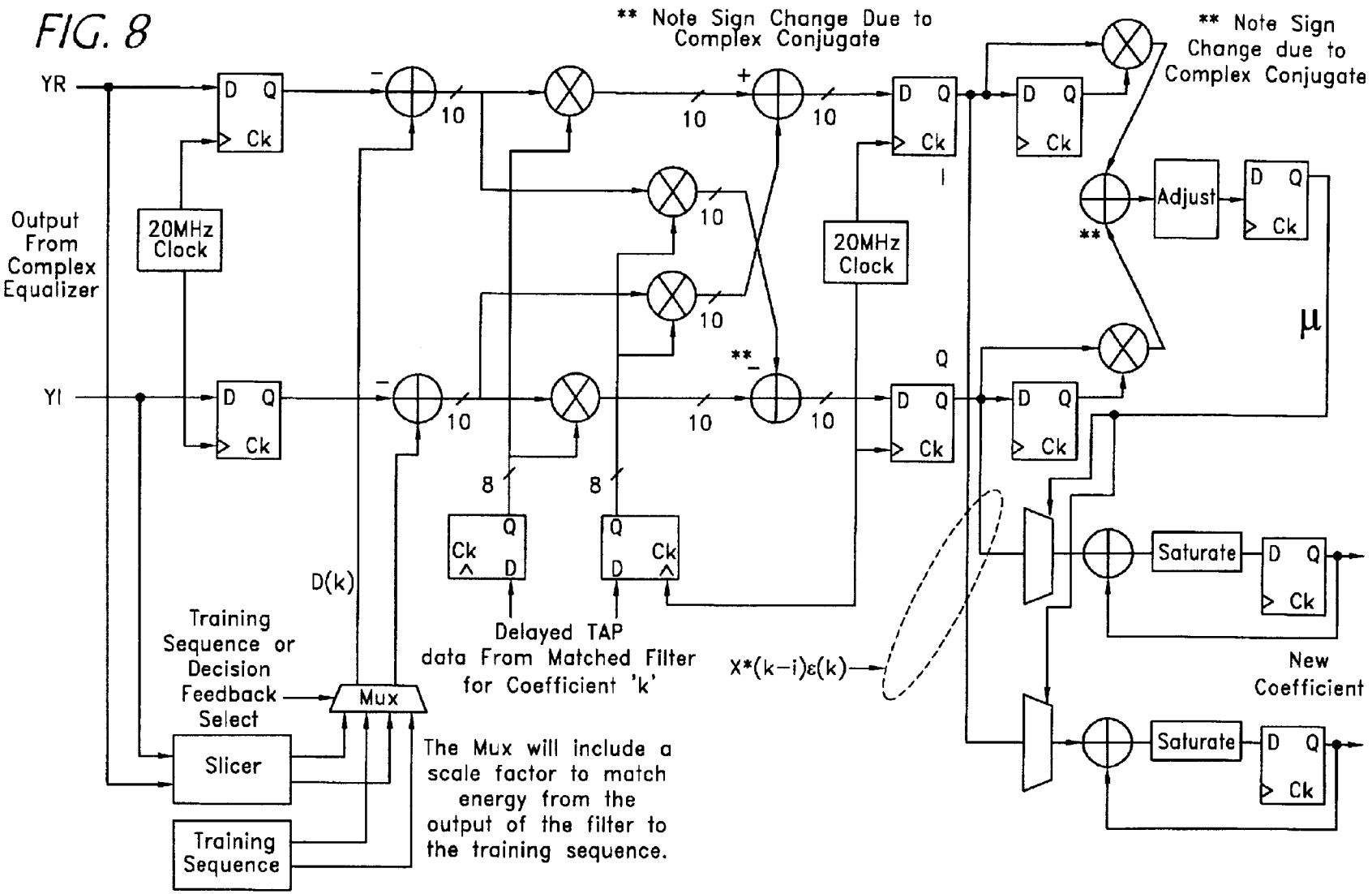
FIG. 8 is a block diagram of one embodiment of a tap update circuit from the digital equalization module shown in FIG. 3.

FIG. 8 illustrates an embodiment of a feed forward tap update module 934 (illustrated in FIG. 3). Upon initial acquisition, remote sites Reset, or remote sites register, the taps are reset such that the center tap is set to '1' and the other taps are reset to '0'. If the taps have been initialized and adapted in past history, the tap update circuit receives a stored coefficient from the medium access control processor. The taps are updated to their new value by converging with either a training sequence (preamble) or the decision feedback 936 data from the decision device 958. After remote site processing, the medium access control processor is responsible for storing the updated coefficients to a remote site database.

Preferably, the digital equalization module 930 coefficients are initialized to take advantage of the knowledge gained during the previous bursts. Initialization relieves some of the concerns related to the digital equalization module 930 convergence time. One approach is to initialize the taps with the values from the end of the previous burst. However, this results in the digital equalization module 930 possibly having adapted to correct a phase shift (e.g., one introduced by phase noise or frequency offset) during the previous burst. At the beginning of the new burst, the correlation timing recovery module 916 re-calculates the initial phase and sets the symbol rotator to properly rotate the signal. This calculation assumes that the digital equalization module 930 does not introduce any overall phase rotation.

A method for estimating the phase shift caused by the digital equalization module 930 and the mathematical basis will now be described.

Figure 9:
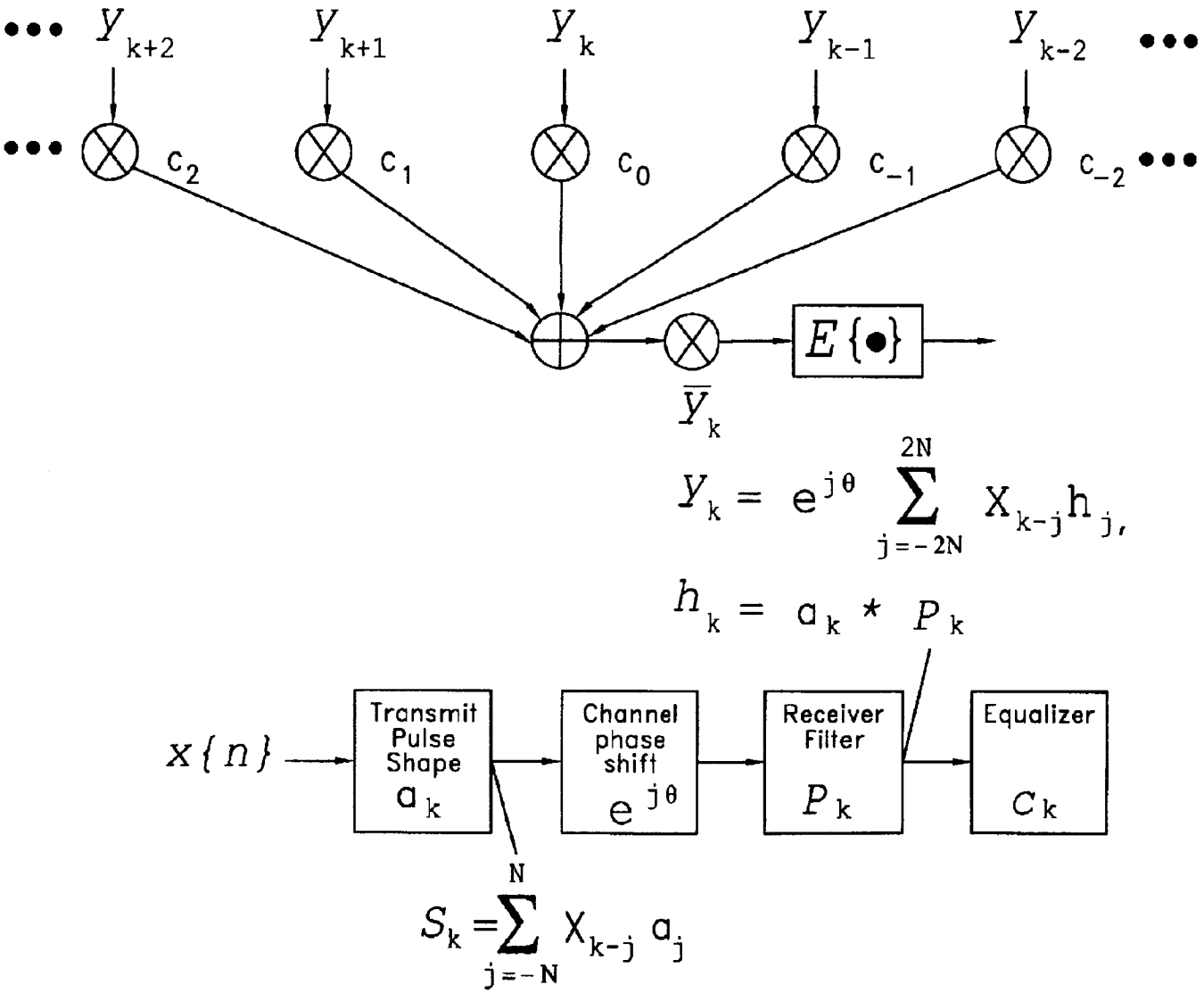
FIG. 9 is a block diagram of one embodiment of a system for estimating the phase shift caused by the digital equalization module shown in FIG. 3.

FIG. 9 illustrates a simplified block diagram of the system. For purposes of simplicity, the transmit and matched filters are assumed to have 2 samples per symbol. The odd samples of x are assumed to be zero (i.e., the pulse shape filter does the interpolation from 1 sample/symbol to 2 samples/symbol). The digital equalization module 930 is assumed to be T/2 spaced.

If the channel is assumed to have no intersymbol interference, and the cascade of the transmit and matched filters is assumed to create an ideal Nyquist filter, then the even values of y are simply phase-shifted versions of the transmitted symbols, x. This is true because the even values of h are zero (except for $h_0$). If the digital equalization module 930 is also assumed to do a decimation (as our implementation does), then the digital equalization module 930 outputs a value when the even values of y line up with the main tap. To determine the phase shift induced by the digital equalization module 930, the correlation between the input and output of the digital equalization module 930 at zero lag is desired. This is illustrated by the calculations described below.

The output of the expectation operator for each tap is calculated individually (denoted it as $r_m$):

$$\begin{aligned} r_2 &= E\{c_2 y_{k+2} \bar{y}_k\} \\ &= c_2 E\{x_{n+2} e^{j\theta} \bar{x}_n e^{-j\theta}\} \\ &= c_2 E\{x_{n+2} \bar{x}_n\} \\ &\quad \text{but transmit symbols (x) are uncorrelated, so} \\ &= c_2 0 = 0 \end{aligned}$$

$$\begin{aligned} r_1 &= E\{c_1 y_{k+1} \bar{y}_k\} \\ &= c_1 E\left\{e^{j\theta} \bar{x}_k e^{-j\theta} \sum_{m=-2N}^{2N} x_{k+1-m} h_m\right\} \\ &= c_1 E\{\ldots + h_{-2} \bar{x}_k x_{k+3} + h_{-1} \bar{x}_k x_{k+2} + h_0 \bar{x}_k x_{k-1} + h_1 \bar{x}_k x_{k-2} + \ldots) \\ &= c_1 h_1 E\{|x_k|^2\} \end{aligned}$$

$$\begin{aligned} r_0 &= E\{c_0 y_k \bar{y}_k\} \\ &= c_0 E\{x_k e^{j\theta} \bar{x}_k e^{-j\theta} \\ &= c_0 h_0 E\{|x_k|^2\} \end{aligned}$$

$$\begin{aligned} r_{-1} &= E\{c_{-1} y_{k-1} \bar{y}_k\} \\ &= c_{-1} E\left\{e^{j\theta} \bar{x}_k e^{-j\theta} \sum_{m=-2N}^{2N} x_{k-1-m} h_m\right\} \\ &= c_{-1} E\{\ldots + h_{-2} \bar{x}_k x_{k+1} + h_{-1} \bar{x}_k x_k + h_0 \bar{x}_k x_{k-1} + h_1 \bar{x}_k x_{k-2} + \ldots) \\ &= c_{-1} h_{-1} E\{|x_k|^2\} \end{aligned}$$

$$\begin{aligned} r_{-2} &= E\{c_{-2} y_{k-2} \bar{y}_k\} \\ &= c_{-2} E\{x_{n-2} e^{j\theta} \bar{x}_n e^{-j\theta} \\ &= c_{-2} E\{x_{n-2} \bar{x}_n\} \\ &= c_{-2} 0 = 0 \end{aligned}$$

Summing all the contributors to the correlation, only those from the main tap and the two adjacent to the main tap are non-zero:

$$\begin{aligned} r &= r_{-1} + r_0 + r_{+1} \\ &= E\{|x_k|^2\} \cdot (c_{-1} h_{-1} + c_0 h_0 + c_1 h_1) \end{aligned}$$

Calculating for the angle of the correlation value:

$$\phi_{eq} = \text{angle}(c_{-1} h_{-1} + c_0 h_0 + c_1 h_1)$$

for raised cosine filter,
with $\alpha$ of 0.25

$$\phi_{eq} = \text{angle}(0.627 c_{-1} + c_0 + 0.627 c_1)$$

A Mathcad simulation has been used to check the results shown above. With no timing error, the module shown above has been verified to be accurate. Although timing error was not included in the analysis above, the Mathcad simulation has shown that with reasonable timing error (e.g., T/8), the errors in the method shown above are very small (<0.3°).

Figure 10:
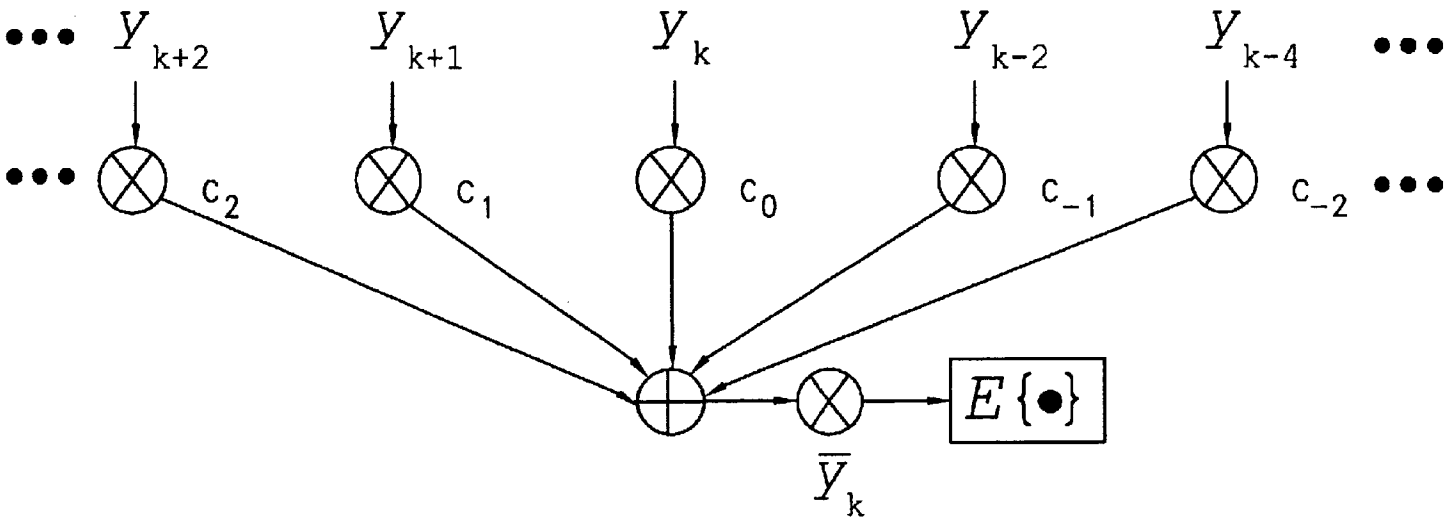
FIG. 10 is an illustration of one state of the digital equalization module shown in FIG. 3.
Figure 11:
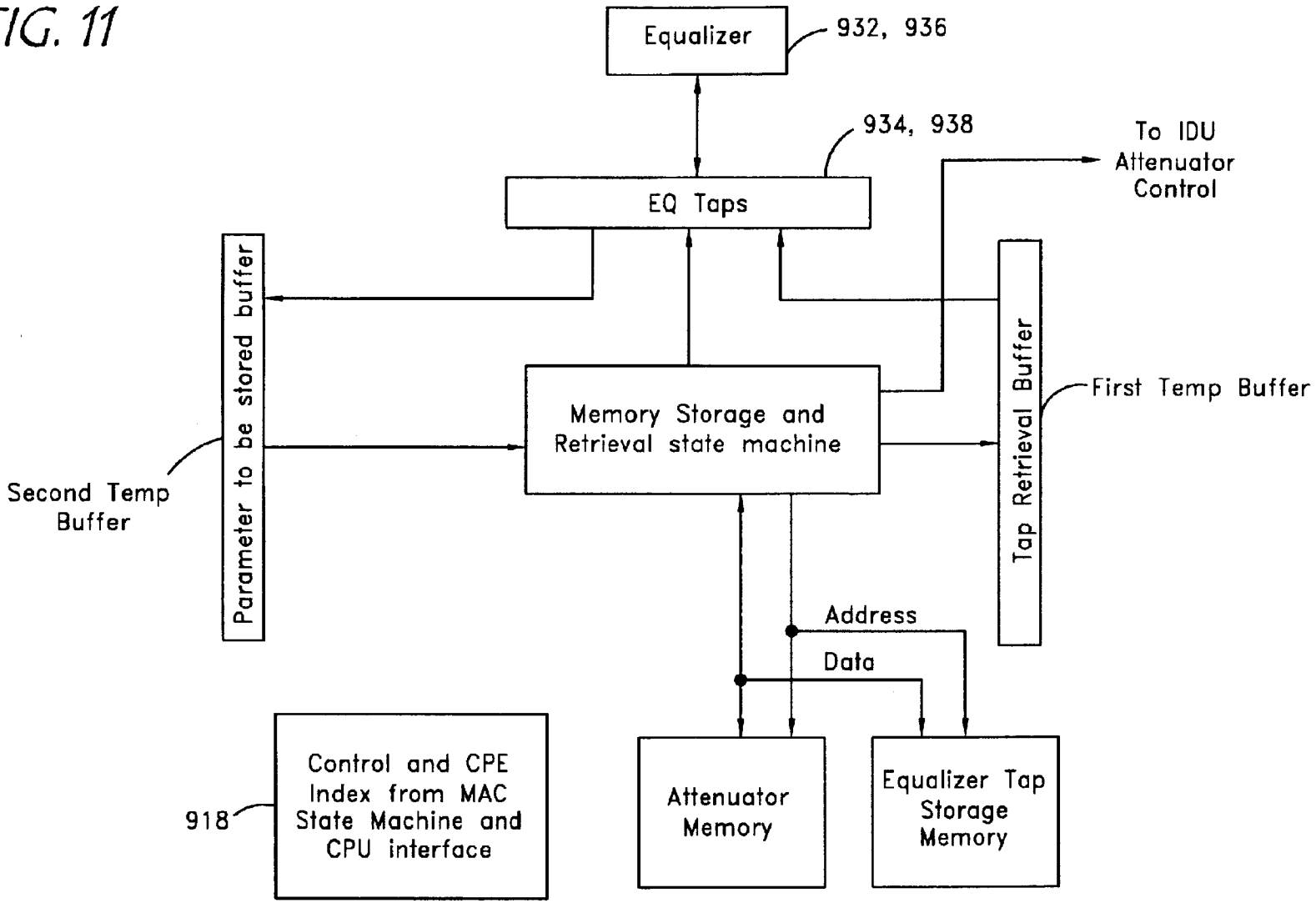
FIG. 11 is an internal block diagram of a parameter storage module.

One embodiment of the adaptation module 938 in the digital equalization module 930 (illustrated in FIGS. 2 and 3) uses a T/2 feed-forward filter, followed by a T-spaced decision feedback section. If the correct decisions are assumed to have been made, the adaptation module 938 can be illustrated as shown in FIG. 10.

By calculating the correlation as described above with reference to FIG. 9, the angle of the correlation is arrived at as follows:

$$\emptyset_{eq}=\text{angle}(c_0h_0+c_1h_1)$$

for raised cosine filter,
with $\alpha$ of 0.25

$$\emptyset_{eq}=\text{angle}(c_0+0.627c_1)$$

If the channel has non-zero intersymbol interference, the above descriptions can be characterized as approximately true. Intersymbol interference will change the weighting factor for the two taps adjacent to the main tap, and the contribution of the other taps to the digital equalization module 930 phase shift becomes non-zero. Simulation results have shown that the adaptive module 938 described above is effective with all intermediate frequency filter models. Thus, since the magnitude of the intersymbol interference is typically small, it can be neglected.

As illustrated in FIG. 2, the output of the digital equalization module 930 is fed to the digital phase-locked loop module 950. One embodiment of the digital phase-locked loop module 950 includes a numerically controlled oscillator 952, a loop filter module 954, a phase error module 956, and a decision device 958. The decision device 958 receives the signal from the digital equalization module 930 and maps each complex signal pair into a sliced constellation symbol.

The digital phase-locked loop 950 uses the input and output of the decision device 958 to continuously correct any phase error using hardware complex multipliers (or rotators) 953. The output of the decision device 958 is also fed back into the decision feedback module 936 of the digital equalization module 930, where it is used to adapt the equalizer coefficients.

FIG. 2 illustrates a parameter storage module 933. The parameter storage module 933 contains channel characteristics, in the form of taps, corresponding to each remote site. In one embodiment, each remote site has different tap values, each of which corresponds to a recent communication parameter by the remote site. Since each remote site has different channel characteristic, each remote site's tap values must be stored and retrieved independently. The digital equalization module 930 receives, from the parameter storage module 933, the tap values corresponding to the remote site that is presently sending an uplink burst to the modem 100. Once received, the digital equalization module 930 sets the correct channel characteristics for the incoming burst from the remote site which helps the modem 100 perform by keeping estimates of the channel characteristics for each transmission from each remote site. In one embodiment, the acquisition, tracking and modulation control module 918 generates an index of remote sites and their associated tap values to expedite their retrieval from the parameter storage module 933. After receiving a burst from one of the remote sites, the parameter storage module 933 updates the stored tap values for that remote site.

Figure 12:
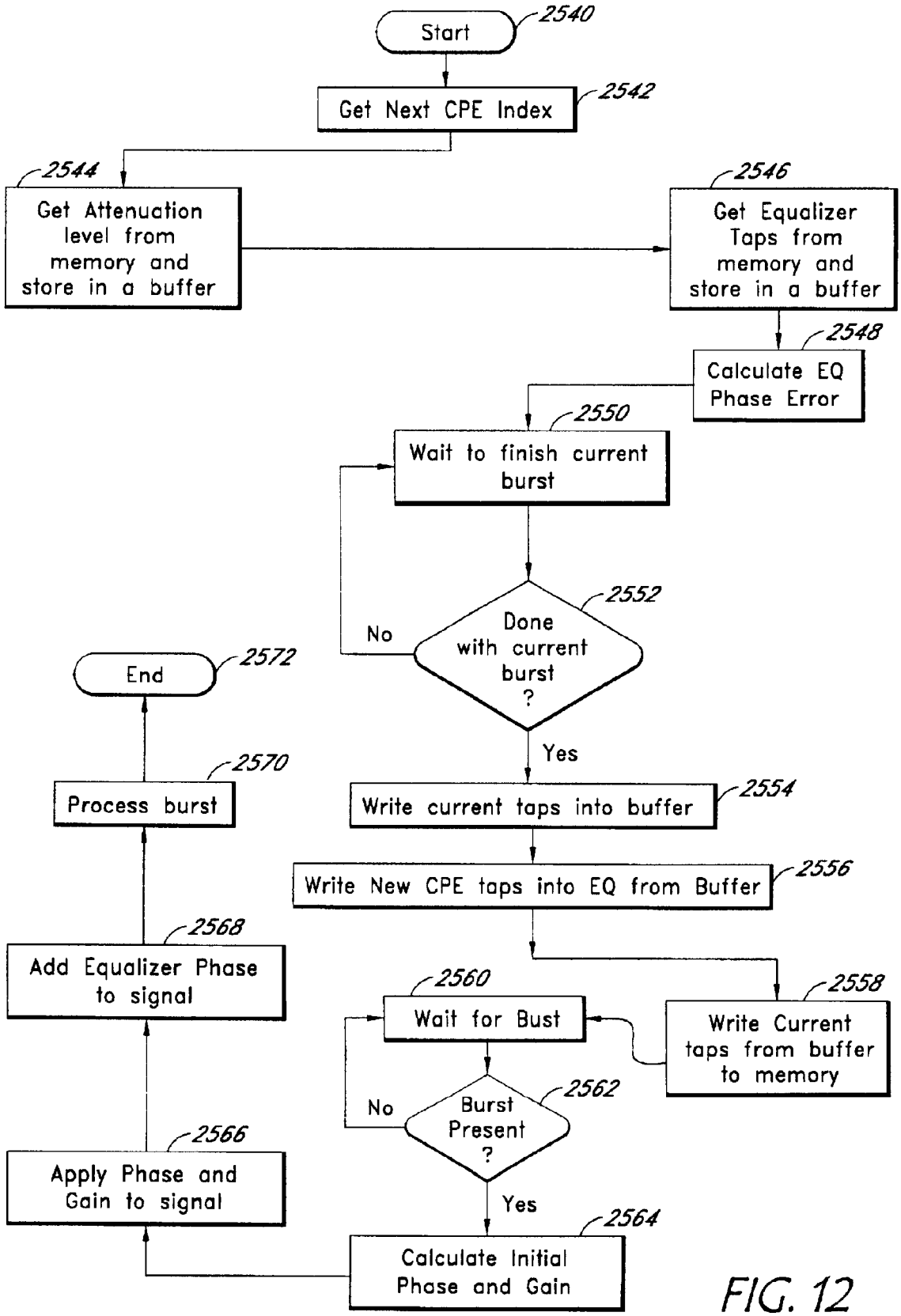
FIG. 12 is a signal flow diagram of the process performed by the parameter storage module in processing uplink bursts.

FIG. 12 is a signal flow diagram of the process performed by the parameter storage module 933, illustrated in FIG. 2, in processing uplink bursts after the correlation timing recovery module 916 but before the decision device module 958. The process stores and retrieves parameters to/from memory when processing bursts from different remote sites at the home base receiver module 102.

The process begins at a start state 2540. Next at a state 2542 the home base receiver retrieves a remote site number from the acquisition, tracking and modulation control 918. Next, at a state 2544, the parameter storage module 933 retrieves parameters for this (next) remote site, for example, the equalizer taps from the previous burst. Next, at a state 2546, the parameter storage module 933 retrieves parameters for this (next) remote site, for example, the attenuation levels. In one embodiment, these parameters are stored in a first temporary buffer. Flow proceeds to a state 2550 where the parameter storage module 933 waits until the current burst is completed. Flow continues to a decision state 2552 where the process determines whether the current burst is completed. If the home base receiver is currently processing an uplink burst, the parameter storage module 933 waits until the current burst is finished. In one embodiment, the acquisition, tracking and modulation control module 918 informs the parameter storage module 933 that the current burst is finished. If the current burst is not completed, the process loops back to state 2550. Otherwise, if the current burst is completed, flow proceeds to a state 2554 where the retrieved parameters for the current remote site are stored into a second temporary buffer.

In one embodiment, the decision whether to store the parameters depends on the state of the processed error metrics calculated by the error recovery module 968. For example, if the error thresholds are not exceeded, the parameter storage module 933 stores the retrieved parameters. Next at a state 2556, the attenuation and EQ taps for the current remote site retrieved from the feed forward tap update 934 and DFE adaptive algorithm 938 are stored into a second temporary buffer. Flow proceeds to a state 2558 where the parameters from the first temporary buffer for the next remote site burst are transferred to the feed forward tap update 934 and DFE adaptive algorithm 938 modules.

Continuing to a state 2560, the modem 100 waits for the next remote site burst to arrive. Also at state 2560, the parameter storage module 933 writes the parameters from the second temporary buffer to the parameter storage memory 933. Next at a decision state 2562, the correlation timing recovery module 916 sends a message to the modem processing blocks when the next remote site burst is present. If a burst is not present, flow loops back to state 2560 as discussed above. Otherwise, if the next remote site burst is present, the process continues to a state 2564 where the correlation timing recovery module 916 calculates the initial phase and gain of the burst. Next at a state 2566, the correlation timing recovery module 916 applies the gain and phase to the initial gain adjust module 920 and 952 respectfully. Next at a state 2568 the parameter storage memory 933 calculates the Equalizer phase offset from the retrieved EQ taps and then applies this offset to the numerically controlled oscillator 952. Next at a state 2570, the burst is ready to be processed by the receive chain of the home base receiver module 102. Flow then proceeds to an end state 2572. In one embodiment, this process is performed for each received uplink burst.

To increase the likelihood that the stored channel parameters, or taps, will be valid for an incoming burst, factors, such as, symbol timing, interpolator timing, end of a burst gain value, and any phase offset generated by the digital equalization module 930, may be optimized. In one embodiment, locking the symbol timing within ⅛ symbol, locking the timing interpolator, providing a nominal gain of '1' for the taps at the end of a burst, and compensating for any phase offset generated by the digital equalization module 930 at the beginning of the following burst are done to increase the likelihood that an incoming burst will be recognized and found valid.

Figure 13:
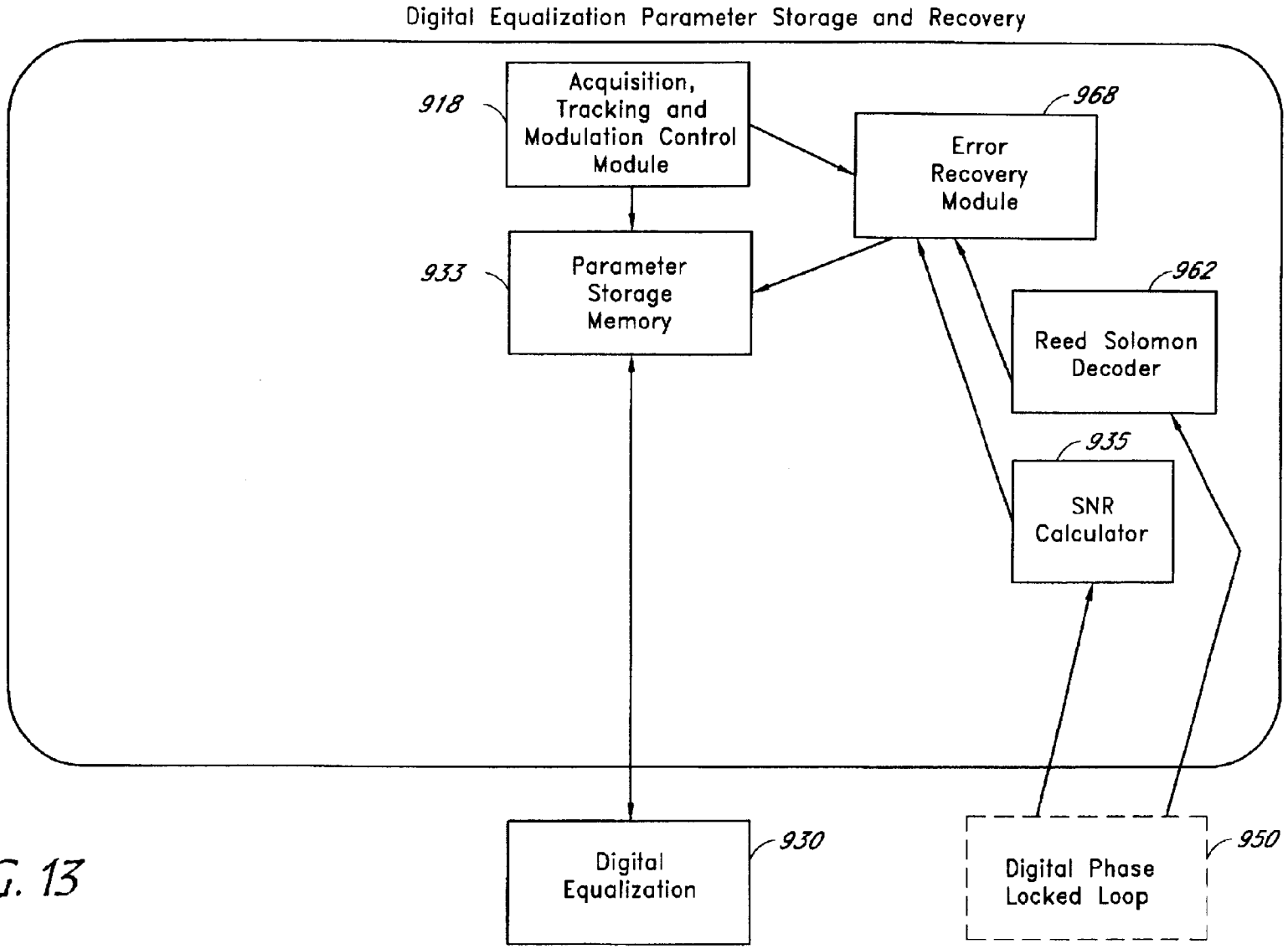
FIG. 13 is a block diagram of one embodiment of a Digital Equalization Parameter Storage and Recovery system.

FIG. 13 illustrates a Digital Equalization Parameter Storage and Recovery system. The Digital Equalization Parameter Storage and Recovery system includes the acquisition, tracking, and modulation control module 918, the digital equalization module 930, the parameter storage memory module 933, an error recovery module 968, the reed solomon decoder module 962, and the SNR calculator 935. In one embodiment, the SNR calculator 935 calculates the mean square error between the received symbol and the expected optimal symbol. By accumulating and averaging these calculations, an accurate measurement of the noise or interference of the system is measured. For example, when the SNR is high, the system can operate at a high order of modulation, say QAM-64. If the SNR is Low, the system must operate at a more robust modulation scheme such as QPSK. The output of the SNR calculator 935 is fed to the DFE adaptive modulation algorithm 938, which based on particular SNRs will feed the acquisition, tracking and modulation control module 918 to specify which modulation scheme is optimal for the current channel characteristics.

The reed Solomon decoder module 962 calculates the number of errors in a stream of 300-bits to measure the decode error rate. At the end of a burst from a remote site, both of these calculated error values are then compared to threshold values by the error recovery module 968. If either of the calculated values exceed the threshold values, the error recovery module 968 does not update the stored channel parameters, or taps, in the parameter storage memory 933 for that remote site. In one embodiment, the stored channel parameters in the parameter storage memory 933 are reset when the threshold is exceeded. In another embodiment, the stored channel parameters are replaced with zeros if the calculated values exceed the threshold values. If the threshold values are not exceeded, the new calculated channel parameters are stored in the parameter storage memory 933. These new channel parameters are available to the digital equalization module 930 to set the correct channel characteristics for the next incoming burst from the remote site. Thus, the Digital Equalization Parameter Storage and Recovery system provides a recovery system should a catastrophic channel disruption occur.

Figure 14:
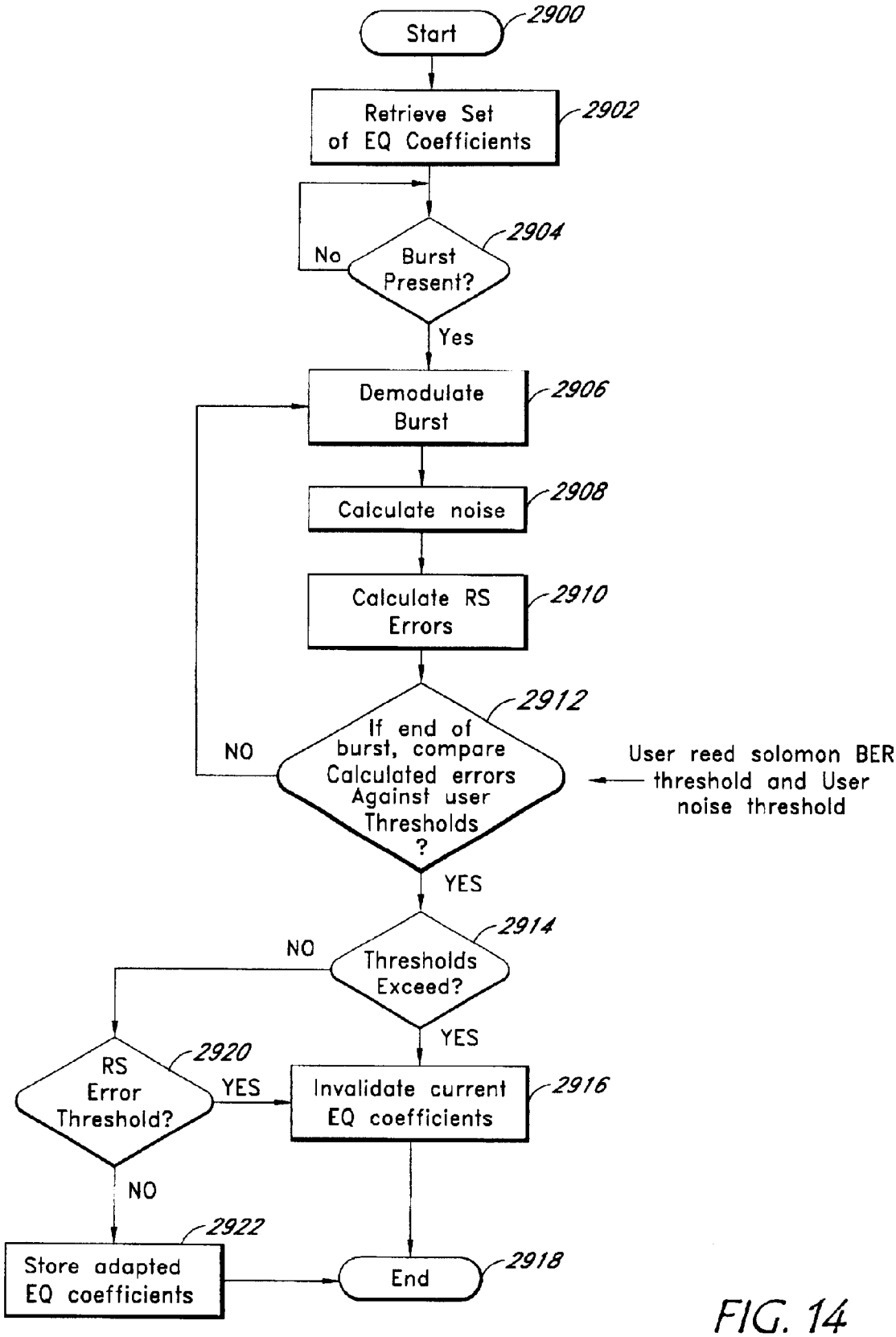
FIG. 14 is a flow chart illustrating the process performed by the error recovery module 968 shown in FIG. 13.

FIG. 14 illustrates the Digital Equalization Parameter Storage and Recovery process. The process begins at a start state 2900 and continues to a state 2902 where the set of stored channel parameters associated with the transmitting remote site is retrieved. Next, at a decision state 2904, a determination is made as to whether a burst the remote site is being received. If a burst is not received, the process loops back to decision state 2904 until a burst is received. If a burst is received, the process moves to a state 2906 where the incoming burst is demodulated. At a next state 2908, the SNR calculator 935 calculates the noise of the demodulated signal. Continuing to a state 2910, the error in the decoded signal is calculated by the reed solomon decoder module 962. Next at a decision state 2912, if the received burst is not at an end, flow continues to state 2906 as discussed above. Returning to decision state 2912, if the received burst is at an end, flow continues to a decision state 2914 to determine if the calculated noise from state 2908 exceeds a threshold value. If the calculated noise exceeds the threshold value, the process proceeds to a state 2916 where the current channel characteristics are invalidated. Flow then ends at an end state 2918.

Returning to decision state 2914, if the calculated noise does not exceed the noise threshold, flow moves to a decision state 2920 to determine if the calculated error in the decode signal exceeds the decode error threshold. If the decode error exceeds the threshold, the process continues to state 2916 as described above. Otherwise, if the calculated error in the decode signal does not exceed the decode threshold, the process moves to a state 2922 where the channel characteristics for the remote site burst are stored in the parameter storage memory 933. Flow then proceeds to the end state 2918.

In downlink communication, the equalization and channel estimation is simpler than in uplink communication. In the downlink direction, immediately after the training sequence is sent, data follows in a QPSK-modulation format. In the uplink direction, on the other hand, a higher-order modulation immediately follows the training sequence, worst case being QAM-64 modulation. In the downlink direction, the probability of making a bit error due to the equalizer not fully undoing the signal impairments is low since the Euclidean distance of received symbols for a QPSK constellation is much greater than the Euclidean distance of symbols for a QAM-64 constellation.

Preambles are not only chosen to converge the digital equalization module 930, but also used for timing recovery. Preambles are chosen such that uplink communication and downlink communication do not interfere with each other. The preamble structure is split into two sections. For the downlink preamble and the uplink-unscheduled preambles, a QPSK portion is repeated twice so that when the received signal is correlated with the local copy, a low probability of preamble false detection will occur when trying to acquire the downlink or when demodulating an unscheduled uplink burst. The receiver module 102 correlator followed by an interpolator filter bank is used to recover the timing by comparing the energy.

In one embodiment, the above noted techniques are used in combination by the modem 100 to perform higher order modulation techniques, for example, QAM 64. These techniques include performing the initial phase calculation on the incoming burst, performing droop compensation, performing a phase calculation on the stored taps, and storing channel characteristics, or taps, after each burst. These techniques are further combined with a method of performing symbol clock synchronization as described in U.S. patent application Ser. No. 09/790,443, filed Mar. 21, 2001 and entitled "SYNCHRONIZING CLOCKS ACROSS A COMMUNICATION LINK" which is hereby incorporated by reference. The combination of these techniques enhances the operation of the modem 100 when performing QAM 64 modulation.

Aspects of the present invention have been disclosed in one or more exemplary embodiments. These embodiments are not to be construed as limiting, but rather as showing a way to practice the invention. The scope of the invention is defined by the claims which follow.

What is claimed is:

1. A method for operation of a modem system which demodulates data bursts from a plurality of remote sites using stored channel parameters for each remote site, the method comprising:

receiving a data burst from a current remote site;

determining a next remote site which will transmit a next data burst;

determining attenuation levels and equalizer tap values for the next remote site based on a previous burst from the next remote site;

determining an equalizer phase error from the determined equalizer tap values for the next remote site;

replacing attenuation levels and equalizer tap values for the current remote site with the determined attenuation levels and equalizer tap values for the next remote site in an equalizer once the burst from the current remote site is completed;

storing the replaced attenuation levels and equalizer tap values for the current remote site for use with a subsequent burst from the current remote site;

receiving the next burst from the next remote site;

determining an initial phase and an initial gain for the received next burst from the next remote site; and demodulating the received next burst from the next remote site using the determined initial phase, initial gain, and equalizer phase error.

2. The method of claim 1, further comprising adjusting the replaced attenuation levels and equalizer tap values during receipt of the burst from the current remote site and storing the adjusted values.

3. The method of claim 1, wherein demodulating the received next burst from the next remote site comprises:

applying the determined initial phase and the initial gain for the next remote site to an initial gain adjust module; and applying the determined equalizer phase error for the next remote site to a numerically controlled oscillator.

4. The method of claim 1, further comprising generating an index of remote sites.

5. The method of claim 1, further comprising:

receiving equalizer tap values associated with the next burst from the next remote site;

determining a gain constant for the equalizer based on the received equalizer tap values; and scaling the input signal of a subsequent burst from the next remote site to the equalizer to achieve a gain value of 1 based on the determined gain constant.

6. The method of claim 5, wherein scaling the input signal of the subsequent burst to the equalizer is performed by assigning a value to at least one of the equalizer tap values at the end of the next burst from the next remote site.

7. The method of claim 5, further comprising compensating for gain variation by adjusting a center equalizer coefficient.

8. The method of claim 5, further comprising storing at least one scaled equalizer tap value at the end of the next burst from the next remote site.

9. The method of claim 6, wherein scaling is performed on all of the equalizer tap values.

10. The method of claim 6, wherein scaling is performed on a center equalizer tap value at the end of the next burst from the next remote site.

11. The method of claim 10, further comprising determining the gain for the equalizer from an angle of the center equalizer tap value.

12. The method of claim 11, wherein the angle includes a sine value.

13. The method of claim 11, wherein the angle includes a cosine value.

14. The method of claim 1, further comprising:

determining a noise value for the demodulated next burst from the next remote site;

determining an error value for the demodulated next burst from the next remote site;

if the determined noise value exceeds a threshold value, invalidating the attenuation levels and equalizer tap values;

if the determined error value exceeds a decode error threshold, invalidating the attenuation levels and equalizer tap values; and storing the valid attenuation and equalizer tap values.

15. The method of claim 14, wherein determining the noise value comprises determining a signal to noise ratio.

16. The method of claim 1, further comprising:

receiving a two part preamble at the start of the next burst from the next remote site, wherein a first part is modulated using a lower order technique and the second part is modulated using a higher order technique than used for the first part; and driving the output of an adaptive filter in the equalizer to minimize errors associated with the demodulation of the next burst which follows the two part preamble.

17. The method of claim 16, wherein the lower order technique is QPSK.

18. The method of claim 16, wherein the higher order technique is QAM 64.

19. The method of claim 16, wherein the higher order technique is QAM 16.

20. The method of claim 16, wherein the first part and the second part of the preamble includes end points and middle QAM 64 points.

21. The method of claim 16, wherein the received two part preamble is used for symbol timing recovery.

22. The method of claim 16, wherein the errors associated with the demodulation of the next burst include a bit error rate and a reed solomon error rate.

23. The method of claim 1, further comprising:

generating an interrupt to the modem in response to a modem system error signal;

halting a modem interface once the modem system error occurs;

setting a reset bit once the modem is halted;

flushing a buffer once the reset bit is set;

realigning the buffer once the buffer is flushed;

reprogramming the buffer once the buffer is realigned; and restarting the modem interface once the buffer is reprogrammed.

24. The method of claim 23, wherein the reset bit is a transmit-reset bit.

25. The method of claim 23, wherein the reset bit is a receive-reset bit.

26. The method of claim 23, wherein the interrupt occurs during modem transmission.

27. The method of claim 23, wherein the interrupt occurs during modem reception.

28. The method of claim 23, wherein the interrupt is generated in response to the modem transmitting at a rate faster than the data is received by the modem.

29. The method of claim 28, wherein the interrupt is generated in response to the modem receiving cyclic redundancy check packets.

30. The method of claim 29, wherein the modem is transmitting using QAM 64.

31. The method of claim 1, further comprising:

determining an expected modulation type for a subsequent burst from the next remote site based on the determined initial phase and the initial gain for the next burst from the next remote site;

selecting an adaptation factor for the equalizer based on the expected modulation type; and applying the selected adaptation factor to the subsequent burst from the next remote site such that the probability that the attenuation levels and tap values stored after demodulating the subsequent burst are correct is increased.

32. The method of claim 31, wherein the expected modulation type is QPSK.

33. The method of claim 31, wherein the expected modulation type is QAM 16.

34. The method of claim 31, wherein the expected modulation type is QAM 64.

35. The method of claim 1, further comprising:

correlating the input and output of the equalizer for the next burst from the next remote site;

determining an angle of correction for the subsequent burst from the next remote site based on the correlation; and shifting the subsequent burst by applying the determined angle of correction to the subsequent burst.

36. The method of claim 35, wherein the angle of correction is determined using the equation $\emptyset_{eq}$=angle ($c_0$+0.627$c_1$), wherein $C_0$ is the center tap value, and wherein $c_1$ is an adjacent tap value.

37. A method for operation of a modem system which demodulates data bursts from a plurality of remote sites using stored channel parameters for each remote site and compensates for gain droop in the modem transmitter, the method comprising:

receiving equalizer tap values associated with a burst from a next remote site;

determining a gain constant for an equalizer based on the received equalizer tap values; and scaling the input signal of a next burst to the equalizer to achieve a gain value of 1 based on the determined gain constant.

38. The method of claim 37, wherein scaling the input signal is performed by assigning a value to at least one equalizer coefficient at the end of the burst.

39. The method of claim 37, further comprising storing at least one scaled equalizer coefficient value at the end of the burst.

40. The method of claim 38, wherein scaling is performed on all of the equalizer coefficients.

41. The method of claim 38, wherein scaling is performed on the center equalizer coefficient.

42. The method of claim 41, further comprising determining the gain for the equalizer from the angle of the center equalizer coefficient at the end of the burst.

43. The method of claim 42, wherein the calculated angle includes a sine value.

44. The method of claim 42, wherein the calculated angle includes a cosine value.

45. The method of claim 37, further comprising compensating for gain variation is performed by the center equalizer coefficient.

46. A method for operation of a modem system which demodulates data bursts from a plurality of remote sites using stored channel parameters for each remote site and improves the convergence of the modem, the method comprising:

transmitting a first part of a preamble that is modulated using a lower order technique;

transmitting a second part of the preamble after transmitting the first part of the preamble, wherein the second part of the preamble is modulated using a higher order technique than the modulation technique used for the first part;

receiving the transmitted preamble at the modem; and driving the output of an adaptive filter in communication with the modem to a known state based on the received preamble.

47. The method of claim 46, wherein the lower order technique is QPSK.

48. The method of claim 46, wherein the higher order technique is QAM 64.

49. The method of claim 46, wherein the higher order technique is QAM 16.

50. The method of claim 46, wherein the first part and the second part of the preamble includes end points and middle QAM 64 points.

51. The method of claim 46, wherein the received preamble is used for symbol timing recovery.

52. The method of claim 46, wherein the method is implemented in a Time Division Duplex system.

53. A method for operation of a modem system which demodulates data bursts from a plurality of remote sites using stored channel parameters for each remote site which corrects the phase shift caused by the storage of equalizer tap values, the method comprising:

correlating the input and output of an equalizer for a received data burst from a next remote site based on equalizer tap values;

determining an angle of correction for an incoming data burst from the next remote site based on the correlation using the equation $\emptyset_{eq}$=angle ($c_0$0.627$c_1$), wherein $c_0$ is the center tap value, and wherein $c_1$ is an adjacent tap value; and shifting the incoming data burst by applying the determined angle of correction to the incoming data burst.

54. The method of claim 53, wherein the method is implemented in a Time Division Duplex system.

55. A modem system which demodulates data bursts from a plurality of remote sites using stored channel parameters for each remote site, the modem comprising:

means for receiving a data burst from a current remote site;

means for determining a next remote site which will transmit a next data burst;

means for determining attenuation levels and equalizer tap values for the next remote site based on a previous burst from the next remote site;

means for determining an equalizer phase error from the determined equalizer tap values for the next remote site;

means for replacing attenuation levels and equalizer tap values for the current remote site with the determined attenuation levels and equalizer tap values for the next remote site in an equalizer once the burst from the current remote site is completed;

means for storing the replaced attenuation levels and equalizer tap values for the current remote site for use with a subsequent burst from the current remote site;

means for receiving the next burst from the next remote site;

means for determining an initial phase and an initial gain for the received next burst from the next remote site; and means for demodulating the received next burst from the next remote site using the determined initial phase, initial gain, and equalizer phase error.

56. A modem system which demodulates data bursts from a plurality of remote sites using stored channel parameters for each remote site and compensates for gain droop in the modem transmitter, the modem comprising:

means for receiving equalizer tap values associated with a burst from a next remote site;

means for determining a gain constant for an equalizer based on the received equalizer tap values; and means for scaling the input signal of a next burst to the equalizer to achieve a gain value of 1 based on the determined gain constant.

*57. A method to demodulate data bursts from a plurality of transmission sites, the method comprising:*

*determining a second transmission site from which to receive a next data burst, said next data burst to be received following receipt of a data burst from a first transmission site;*

*obtaining attenuation levels and equalizer tap values associated with the second transmission site based, at least in part, on a previous data burst received from the second transmission site;*

*determining an equalizer phase error from said obtained equalizer tap values;*

*replacing, in an equalizer, attenuation levels and/or equalizer tap values associated with said first transmission site with the obtained attenuation levels and/or equalizer tap values associated with the second transmission site;*

*storing the replaced attenuation levels and/or equalizer tap values associated with the first transmission site;*

*determining an initial phase and/or an initial gain for the next burst received from the second transmission site; and*

*demodulating the received next burst received from the second transmission site using the determined initial phase, initial gain, and/or equalizer phase error.*

*58. The method of claim 57, further comprising using said stored and replaced attenuation levels and/or equalizer tap values to process a next data burst received from said first transmission site.*

*59. A method, comprising:*

*receiving a preamble from one of a plurality of transmission sites, the preamble including a first part modulated according to a lower order modulation technique and a second part modulated according to a modulation technique of an order higher than said lower order modulation technique; and*

*driving an output signal of an adaptive filter to a state based, at least in part, on said received preamble.*

*60. The method of claim 59, further comprising storing channel parameters associated with two or more of said transmission sites.*

*61. The method of claim 59, wherein the lower order modulation technique comprises QPSK.*

*62. The method of claim 59, wherein the higher order modulation technique comprises QAM 64.*

*63. The method of claim 59, wherein the higher order modulation technique comprises QAM 16.*

*64. The method of claim 59, wherein the first part and the second part of the preamble include end points and middle QAM 64 points.*

*65. The method of claim 59, further comprising recovering symbol timing based, at least in part, on said received preamble.*

*66. The method of claim 59, wherein the method is implemented in a Time Division Duplex system.*

*67. The method of claim 59, wherein said output signal comprises a training sequence.*

*68. An apparatus, comprising:*

*a demodulator to demodulate a preamble received from one of a plurality of transmission sites, said demodulator being adapted to:*

*demodulate a first portion of said preamble according to a first modulation technique; and*

*demodulate a second portion of said preamble according to a second modulation technique, said second modulation technique having an order higher than an order of said first modulation technique; and*

*a circuit to drive an output signal of an adaptive filter in communication with the demodulator to a state based, at least in part, on said received preamble.*

*69. The apparatus of claim 68, wherein said output signal comprises a training sequence.*

*70. The apparatus of claim 68, further comprising storing channel parameters for two or more of said transmission sites.*

*71. The apparatus of claim 68, wherein the lower order modulation technique comprises QPSK.*

*72. The apparatus of claim 68, wherein the higher order modulation technique comprises QAM 64.*

*73. The apparatus of claim 68, wherein the higher order modulation technique comprises QAM 16.*

*74. The apparatus of claim 68, wherein the first portion and the second portion of the preamble include end points and middle QAM 64 points.*

*75. The apparatus of claim 68, further comprising recovering symbol timing based, at least in part, on said received preamble.*

*76. The apparatus of claim 68, wherein the apparatus is implemented in a Time Division Duplex system.*

*77. A method, comprising:*

*storing equalizer tap values associated with a plurality of transmission sites;*

*determining a correlation between an input signal and an output signal based, at least in part, on equalizer tap values associated with a transmission site of said plurality of transmission sites, said input signal being based, at least in part, on an incoming data burst received from said transmission site;*

*determining an angle of correction associated with said correlation based, at least in part, on a weighted sum of a center tap value and one or more adjacent tap values of said equalizer tap values; and*

*shifting said incoming data burst by an amount based, at least in part, on said determined angle of correction.*

*78. The method of claim 77, wherein said weighted sum substantially comprises* $c_0+0.627c_1$ *wherein* $c_0$ *comprises said center tap value and* $c_1$ *comprises an adjacent tap value.*

*79. An apparatus, comprising:*

*a memory to store equalizer tap values associated with a plurality of transmission sites; and*

*an equalizer adapted to:*

*determine a correlation between an input signal and an output signal based, at least in part, on equalizer tap values associated with a transmission site of said plurality of transmission sites, said input signal being based, at least in part, on an incoming data burst received from said transmission site;*

*determine an angle of correction associated with said correlation based, at least in part, on a weighted sum of a center tap value and one or more adjacent tap values of said equalizer tap values; and*

*shift said incoming data burst by an amount based, at least in part, on said determined angle of correction.*

*80. The apparatus of claim 79, wherein said weighted sum substantially comprises* $c_0+0.627c_1$ *wherein* $c_0$ *comprises said center tap value and* $c_1$ *comprises an adjacent tap value.*

*81. A system to demodulate data bursts from a plurality of transmission sites including at least a first transmission site and a second transmission site, the system comprising:*

*a memory to store channel parameters associated with said plurality of transmission sites;*

*an equalizer adapted to:*

*obtain attenuation levels and equalizer tap values associated with said second transmission site based, at least in part, on a previous data burst received from said second transmission site;*

*determine an equalizer phase error based, at least in part, on said obtained equalizer tap values;*

*replace attenuation levels and/or equalizer tap values associated with a data burst received from said first transmission site with said obtained attenuation levels and/or equalizer tap values;*

*store said replaced attenuation levels and/or equalizer tap values in said memory; and*

*determine an initial phase and/or an initial gain for a next data burst received from the second transmission site; and*

*a demodulator to demodulate the next data burst received from the second transmission site based, at least in part, on said determined initial phase, initial gain, and/or equalizer phase error.*

*82. The system of claim 81, further comprising circuitry to adjust the replaced attenuation levels and/or equalizer tap values during receipt of the burst from the first transmission site.*

*83. The system of claim 81, wherein said demodulator is further adapted to:*

*apply the determined initial phase and the initial gain to an initial gain adjust module; and*

*apply the determined equalizer phase error to a numerically controlled oscillator.*

*84. The system of claim 81, further comprising logic to generate an index of transmission sites.*

*85. The system of claim 81, wherein said equalizer is further adapted to obtain equalizer tap values associated with the next data burst from the second transmission site, and wherein said system further comprises gain control circuitry adapted to:*

*determine a gain based, at least in part, on the obtained equalizer tap values; and*

*scale an input signal of a next data burst from the second transmission site to the equalizer to achieve a gain value based, at least in part, on the determined gain.*

*86. The system of claim 85, wherein said gain control circuitry is further adapted to scale said input signal of the next data burst from said second transmission site by assigning a value to at least one of the equalizer tap values at an end of said next data burst from said second transmission site.*

*87. The system of claim 85, wherein said gain control circuitry is further adapted to compensate for gain variation by adjustment of a center equalizer coefficient.*

*88. The system of claim 85, further comprising a memory to store at least one scaled equalizer tap value at an end of the next data burst from the second transmission site.*

*89. The system of claim 86, wherein said gain control circuitry is further adapted to scale all of said equalizer tap values.*

*90. The system of claim 86, wherein said gain control circuitry is further adapted to scale said input signal at a center equalizer tap value at the end of the next data burst from the second transmission site.*

*91. The system of claim 90, wherein said gain control circuitry is further adapted to determine the gain for said equalizer based, at least in part, on an angle of the center equalizer tap value.*

*92. The system of claim 91, wherein said angle includes a sine value.*

*93. The system of claim 91, wherein the angle includes a cosine value.*

*94. The system of claim 81, wherein said system is further adapted to:*

*determine a noise value for the demodulated next data burst from the second transmission site;*

*determine an error value for the demodulated next data burst from the second transmission site;*

*invalidate the attenuation levels and/or equalizer tap values in response to said determined noise value exceeding a threshold value;*

*invalidate the attenuation levels and/or equalizer tap values in response to said determined error value exceeding a decode error threshold; and*

*storing valid said attenuation and equalizer tap values.*

*95. The system of claim 94, wherein said system is further adapted to determine the noise value based, at least in part, on a signal to noise ratio.*

*96. The system of claim 81, wherein said demodulator is further adapted to:*

*demodulate a first part of a two part preamble received at a start of the next data burst from the second transmission site according to a first demodulation technique and demodulate a second part of said received preamble according to a second demodulation technique, said second demodulation technique having an order higher than an order of said first demodulation technique; and*

*drive an output signal of an adaptive filter in the equalizer to reduce errors associated with demodulation of said next data burst received from said second transmission site.*

*97. The system of claim 96, wherein said first demodulation technique comprises QPSK.*

*98. The system of claim 96, wherein said second demodulation technique comprises QAM 64.*

*99. The system of claim 96, wherein said second demodulation technique comprises QAM 16.*

*100. The system of claim 96, wherein the first part and the second part of the preamble comprise end and middle QAM 64 points.*

*101. The system of claim 96, further comprising timing recovery circuitry to recover symbol timing based, at least in part, on said received preamble.*

*102. The system of claim 96, wherein said errors associated with the demodulation of said next data burst from said second transmission site include a bit error rate and/or a reed solomon error rate.*

*103. The system of claim 81, wherein said system is further adapted to:*

*halt a modem interface in response to detection of an error;*

*set a reset bit in response to said halt;*

*flush a buffer in response to said set;*

*realign said buffer in response to said flush;*

*reprogram said buffer in response to said realign; and*

*restart said modem interface in response to said reprogram.*

*104. The system of claim 103, wherein the reset bit comprises a transmit-reset bit.*

*105. The system of claim 103, wherein the reset bit comprises a receive-reset bit.*

*106. The system of claim 81, wherein said system is further adapted to:*

*determine an expected modulation type for said next data burst from the second transmission site based, at least in part, on the determined initial phase and/or the initial gain for the next data burst from the second transmission site;*

*select an adaptation factor for the equalizer based, at least in part, on the determined expected modulation type; and*

*apply the selected adaptation factor to the next data burst from the second transmission site.*

*107. The system of claim 106, wherein the expected modulation type comprises QPSK.*

*108. The system of claim 106, wherein the expected modulation type comprises QAM 16.*

*109. The system of claim 106, wherein the expected modulation type comprises QAM 64.*

*110. The system of claim 81, wherein said system is further adapted to:*

*correlate an input signal of said equalizer with an output signal of said equalizer for the next data burst from the second transmission site;*

*determine an angle of correction for the next data burst from the second transmission site based, at least in part, on said correlation; and*

*shift the next data burst received from said second transmission site by applying the determined angle of correction to the next data burst received from said second transmission site.*

*111. The system of claim 110, wherein the angle of correction is based, at least in part, on a weighted sum of a center equalizer tap value and one or more adjacent equalizer tap values.*

*112. The system of claim 111, wherein said weighted sum substantially comprises* $c_0+0.627c_1$ *wherein* $c_0$ *comprises said center tap value and* $c_1$ *comprises an adjacent tap value.*

*113. The system of claim 81, wherein said equalizer is further adapted to use said stored and replaced attenuation levels and/or equalizer tap values to process a next data burst received from said first transmission site.*

*114. A system to demodulate data bursts from a plurality of transmission sites, the system comprising:*

*a memory to store equalizer tap values associated with a data burst from a transmission site of said plurality of transmission sites; and*

*a gain control circuit adapted to:*

*determine a gain for an equalizer based, at least in part, on said stored equalizer tap values; and*

*scale an input signal of a next data burst to the equalizer to achieve a gain value of substantially 1 based, at least in part, on said determined gain.*

*115. The system of claim 114, wherein said equalizer includes a digital equalizer.*

*116. The system of claim 114, wherein said gain control circuit is included in a modem.*

*117. An apparatus, comprising:*

*means for receiving a preamble, the preamble including a first part modulated according to a lower order modulation technique and a second part modulated according to a modulation technique of an order higher than said lower order modulation technique; and*

*means for driving an output signal of an adaptive filter to a state based, at least in part, on said received preamble.*

*118. The apparatus of claim 117, wherein said output signal includes a training sequence.*

*119. The apparatus of claim 117, wherein said lower order modulation technique includes QPSK.*

*120. The apparatus of claim 117, wherein said higher order modulation technique includes QAM 64 or QAM 16.*

* * * * *

UNITED STATES PATENT AND TRADEMARK OFFICE

CERTIFICATE OF CORRECTION

PATENT NO. : RE42,021 E
APPLICATION NO. : 11/187034
DATED : January 4, 2011
INVENTOR(S) : Pollmann et al.

It is certified that error appears in the above-identified patent and that said Letters Patent is hereby corrected as shown below:

Page 2, item (56), under "Other Publications", in Column 2, Line 3, delete "Mathemetical" and insert -- Mathematical --.

Page 2, item (56), under "Other Publications", in Column 2, Line 5, delete "Jul., Oct." and insert -- Jul.-Oct. --.

Page 2, item (56), under "Other Publications", in Column 2, Line 9, delete "Introductionto" and insert -- Introduction to --.

Page 2, item (56), under "Other Publications", in Column 2, Line 20, delete "Freqency" and insert -- Frequency --.

Column 15, line 17, in Claim 36, delete "$C_0$" and insert -- $c_0$ --.

Column 16, line 25, in Claim 53, delete "($c_0 0.627c_1$)," and insert -- ($c_0$+0.627$c_1$), --.

Signed and Sealed this
Seventeenth Day of May, 2011

David J. Kappos

David J. Kappos
*Director of the United States Patent and Trademark Office*